(12) United States Patent
Lomayev et al.

(10) Patent No.: US 9,698,877 B2
(45) Date of Patent: Jul. 4, 2017

(54) APPARATUS, SYSTEM AND METHOD OF SINGLE-USER (SU) MULTI-IN-MULTI-OUT (MIMO) COMMUNICATION

(71) Applicant: INTEL CORPORATION, Santa Clara, CA (US)

(72) Inventors: Artyom Lomayev, Nizhny Novgorod (RU); Alexander Maltsev, Nizhny Novgorod (RU); Michael Genossar, Modiin (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/998,278

(22) Filed: Dec. 26, 2015

(65) Prior Publication Data
US 2017/0033847 A1 Feb. 2, 2017

Related U.S. Application Data

(60) Provisional application No. 62/200,059, filed on Aug. 2, 2015.

(51) Int. Cl.
*H04B 7/0413* (2017.01)
(52) U.S. Cl.
CPC .................................. *H04B 7/0413* (2013.01)
(58) Field of Classification Search
CPC ...... H04B 7/10; H04B 7/0413; H04B 7/0617; H04W 16/28; H04W 40/06; H01Q 21/24; H01Q 25/00
See application file for complete search history.

(56) References Cited

U.S. PATENT DOCUMENTS

| | | | |
|---|---|---|---|
| 2003/0125040 A1* | 7/2003 | Walton | H04B 7/0417 455/454 |
| 2012/0329498 A1* | 12/2012 | Koo | H04J 11/005 455/501 |
| 2013/0202054 A1 | 8/2013 | Khan et al. | |
| 2013/0293419 A1* | 11/2013 | Negus | H04W 4/00 342/371 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Vineeta Panwalkar
(74) *Attorney, Agent, or Firm* — Shichrur & Co.

(57) ABSTRACT

Some demonstrative embodiments include apparatuses, devices, systems and methods of Single-User (SU) Multi-In-Multi-Out (MIMO) communication. For example, a first wireless station may configure at least one Phase Antenna Array (PAA) according to a predefined SU MIMO configuration, the SU MIMO configuration including at least a number of data streams, a number of PAAs to be used by the first wireless station, and a polarization type to be applied at the first wireless station; and may transmit a SU MIMO transmission to a second wireless station via the at least one PAA over a directional wireless communication band.

25 Claims, 20 Drawing Sheets

– MIMO configuration

– Examples of beamformed links

(56) References Cited

U.S. PATENT DOCUMENTS

2014/0177742 A1    6/2014   Maltsev et al.
2014/0210666 A1    7/2014   Maltsev et al.
2014/0348109 A1   11/2014   Chen et al.

OTHER PUBLICATIONS

IEEE Standard for Information technology, Telecommunications and information exchange between systems, Local and metropolitan area networks, Part 11: Wireless LAN Medium Access Control (MAC) and Physical Layer (PHY) Specifications, Specific requirements. Dec. 11, 2013, 424 pages.

IEEE Standard for Information technology, Telecommunications and information exchange between systems, Local and metropolitan area networks, Specific requirements Part 11: Wireless LAN Medium Access Control (MAC) and Physical Layer (PHY) Specifications, Dec. 28, 2012, 628 pages.

Wigig Wireless Gigabit Alliance, Wigig MAC and PHY Specification Version 1.1, Apr. 2011, 442 pages.

International Search Report and Written Opinion for PCT/US2016/040913, mailed on Sep. 12, 2016, 11 pages.

Alexander Maltsev et al, 'Experimental Measurements for Short Range LOS SU-MIMO', IEEE 802.11-15/0632r1, May 12, 2015, 14 pages.

* cited by examiner

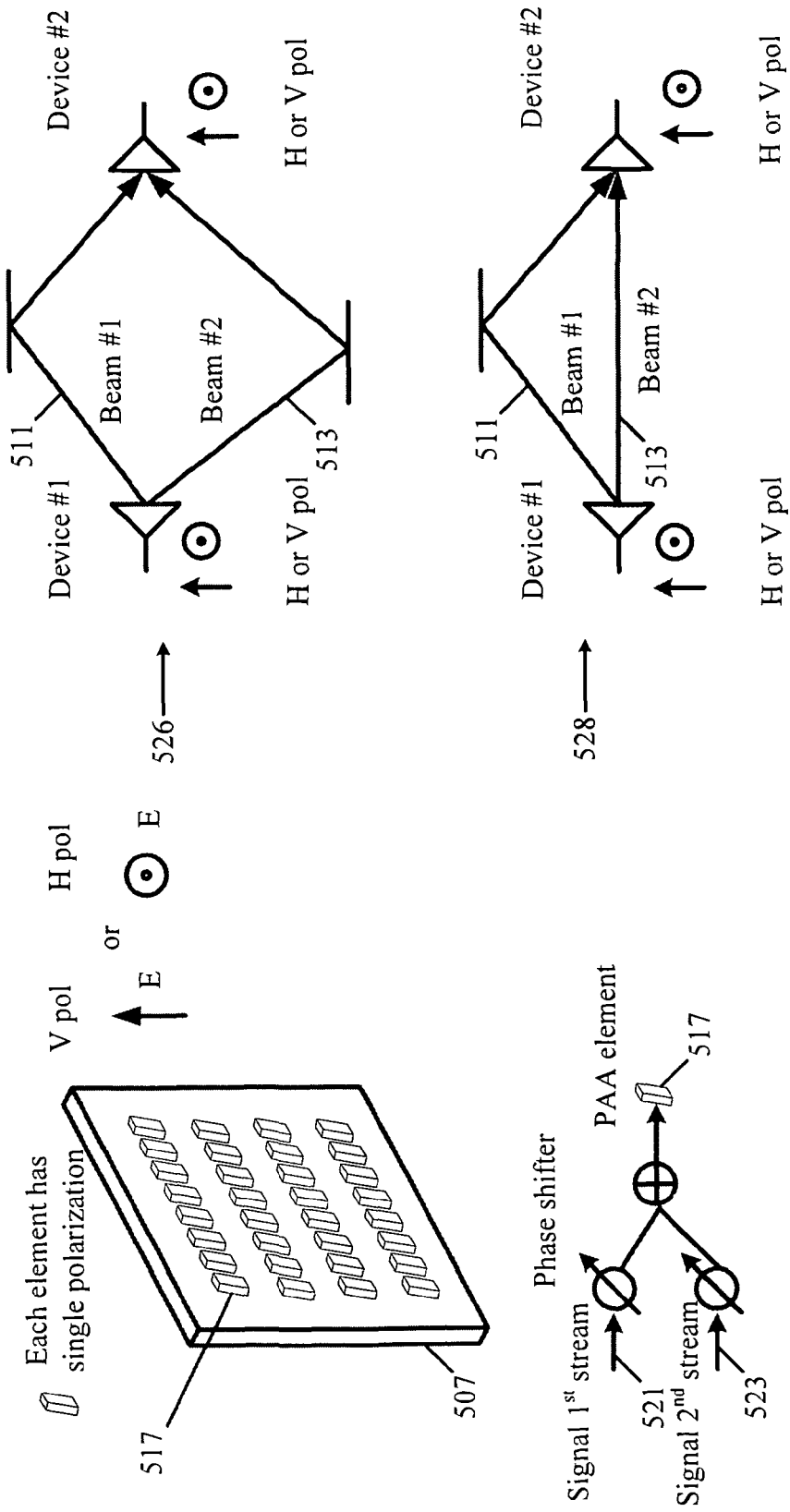
Fig. 5A – MIMO configuration
Fig. 5B – Examples of beamformed links

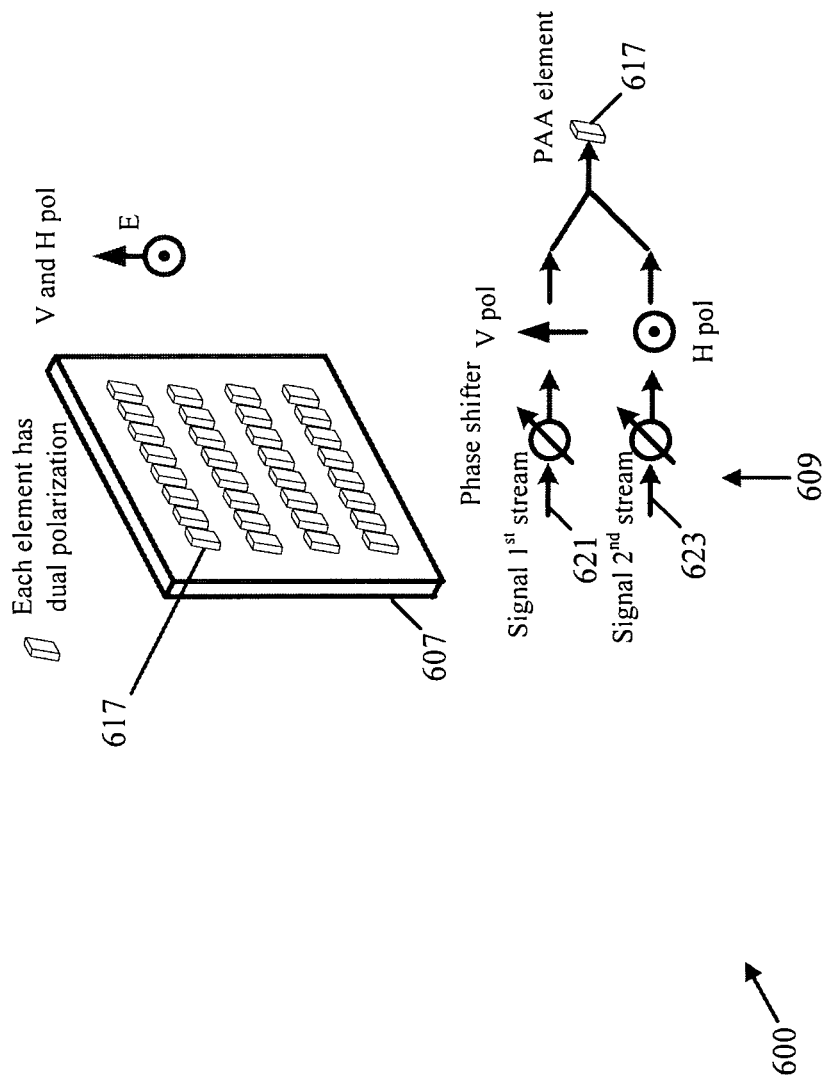
Fig. 6A – MIMO configuration

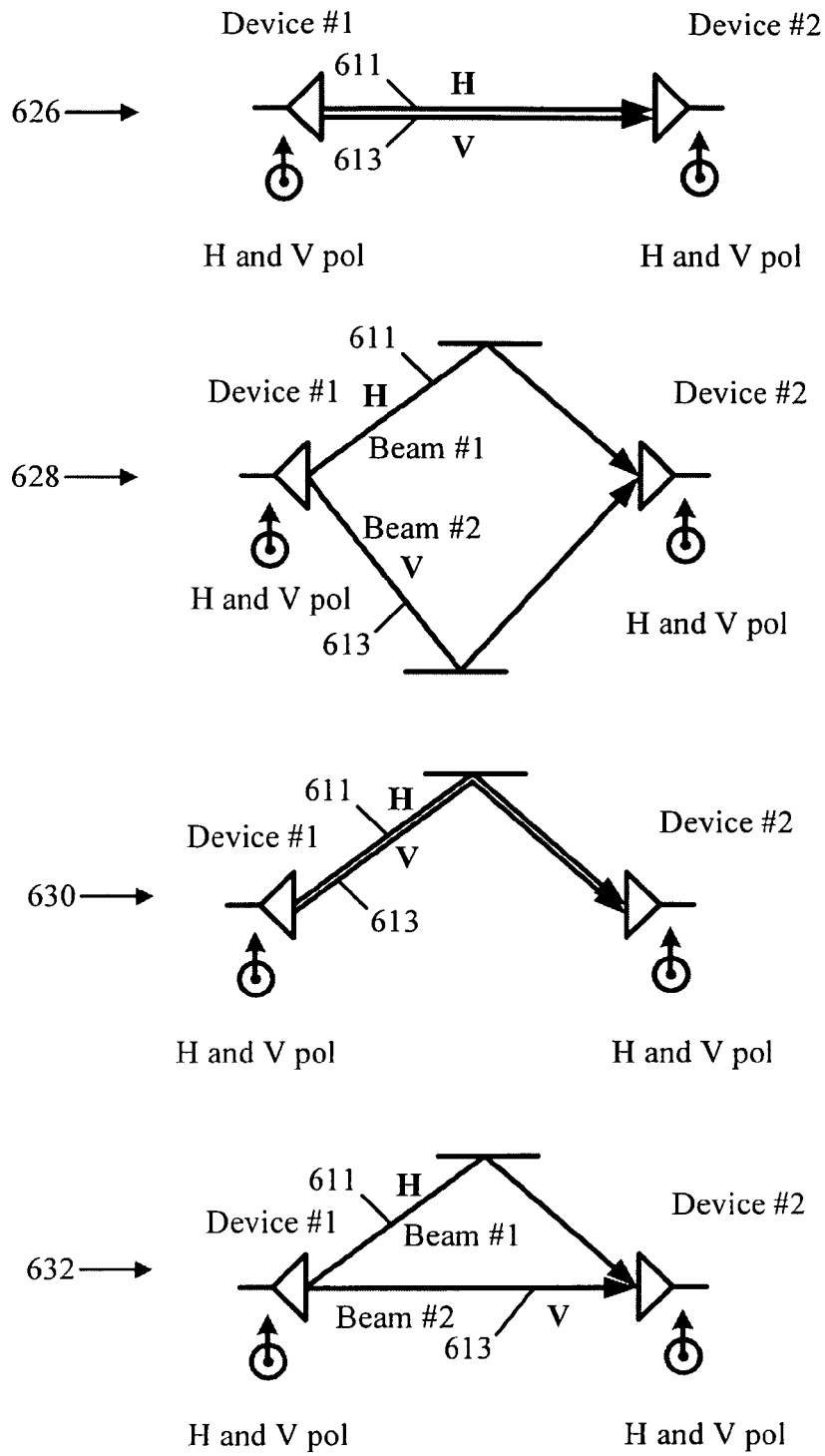
Fig. 6B – Examples of beamformed links

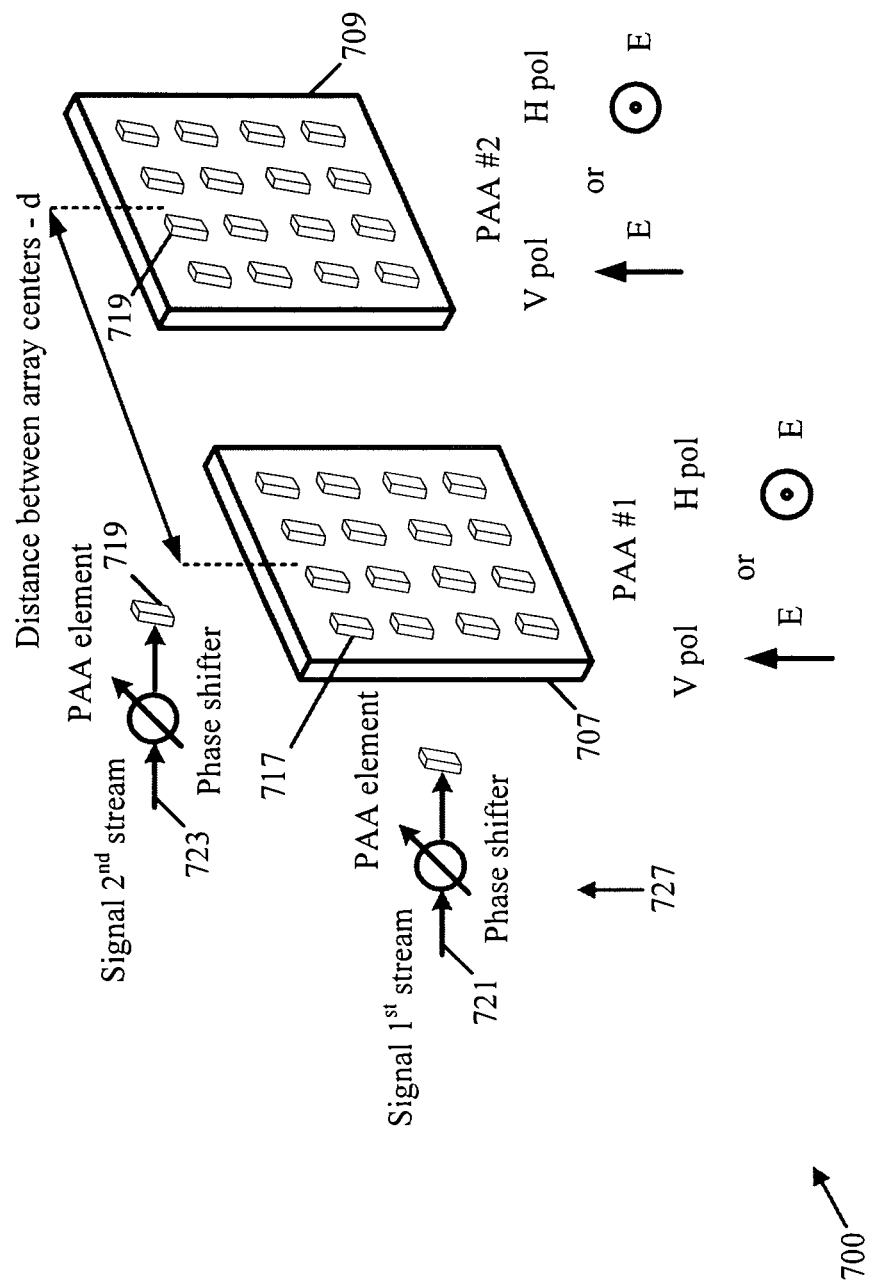
Fig. 7A – MIMO configuration

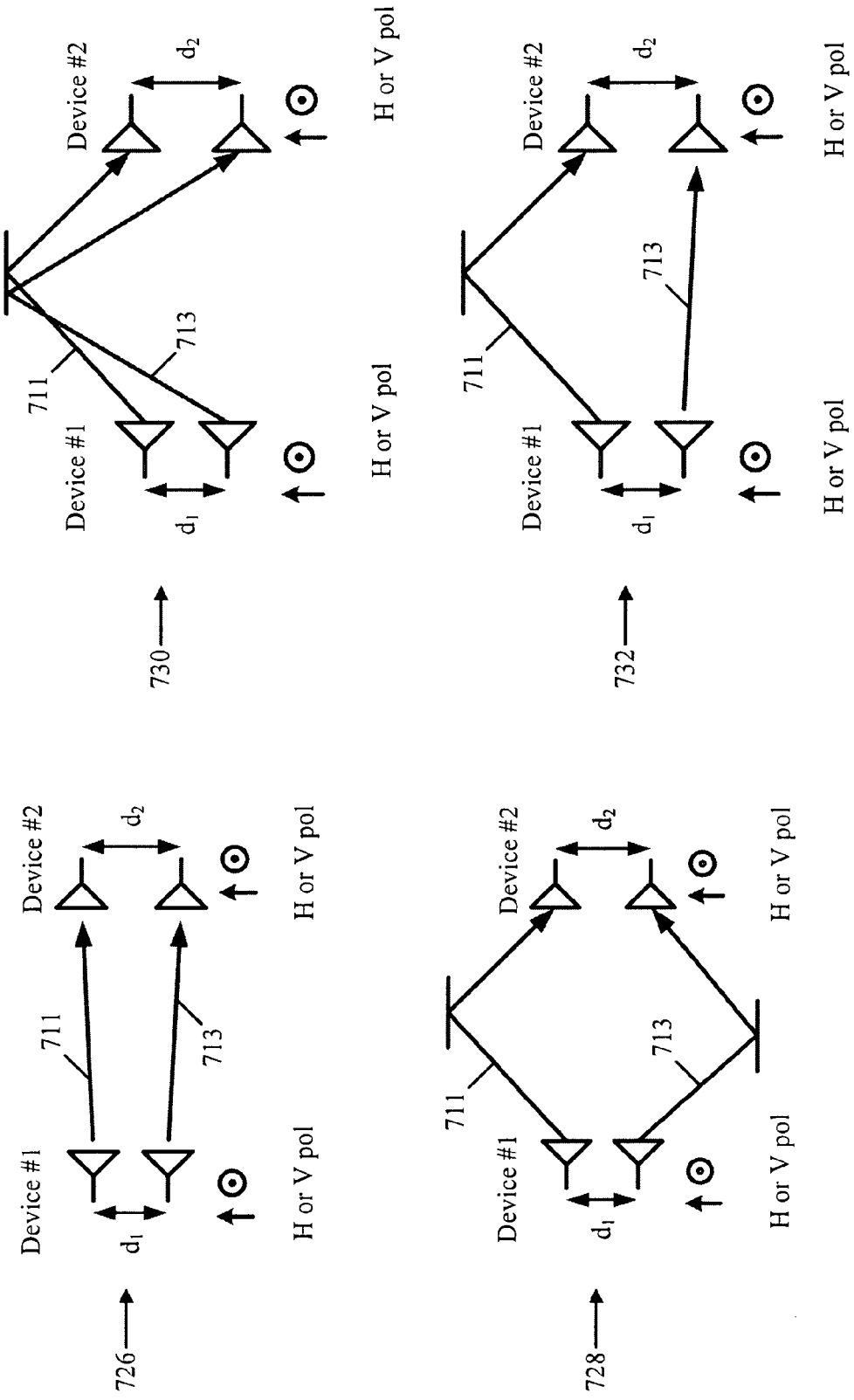
Fig. 7B – Examples of beamformed links

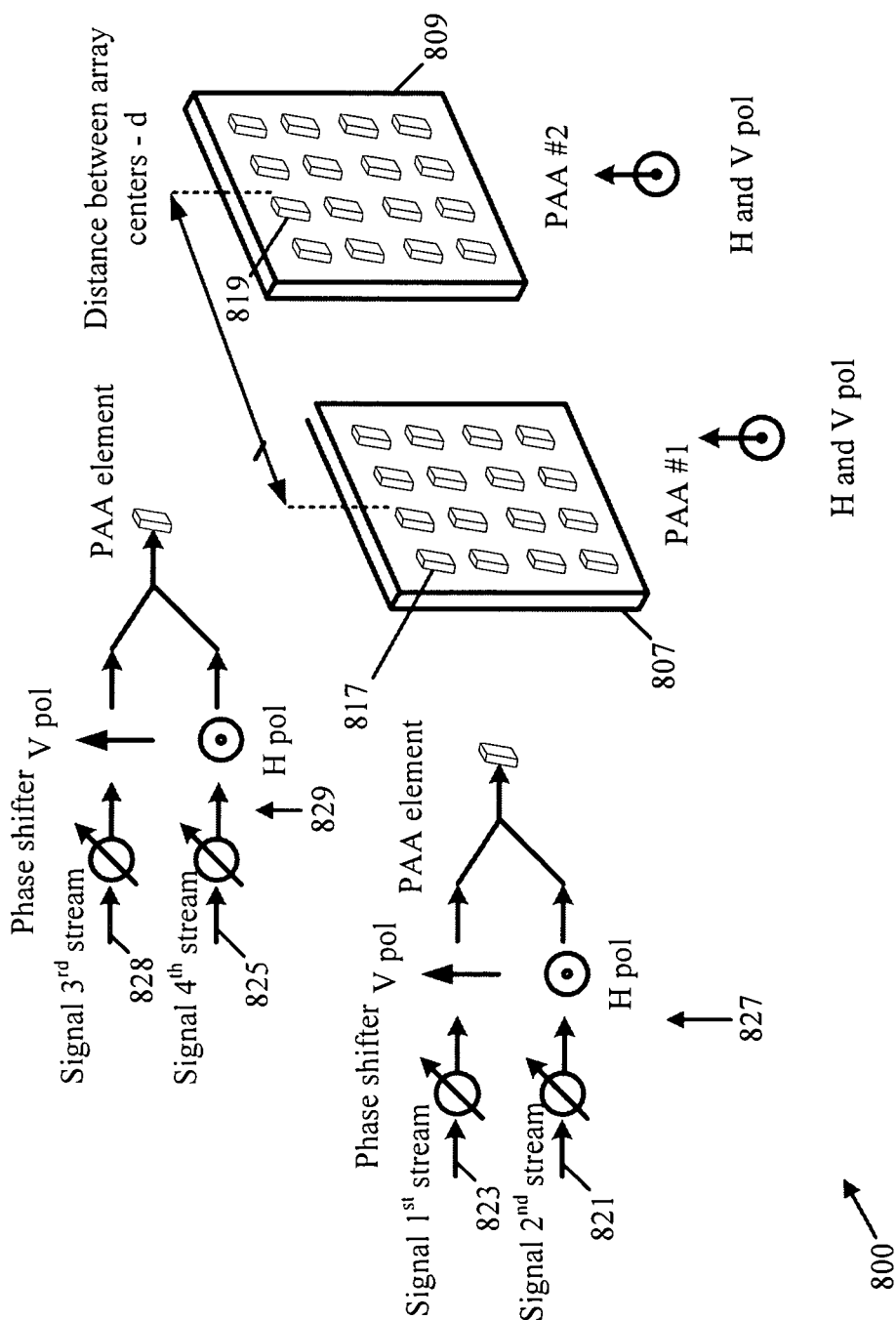
Fig. 8A – MIMO configuration

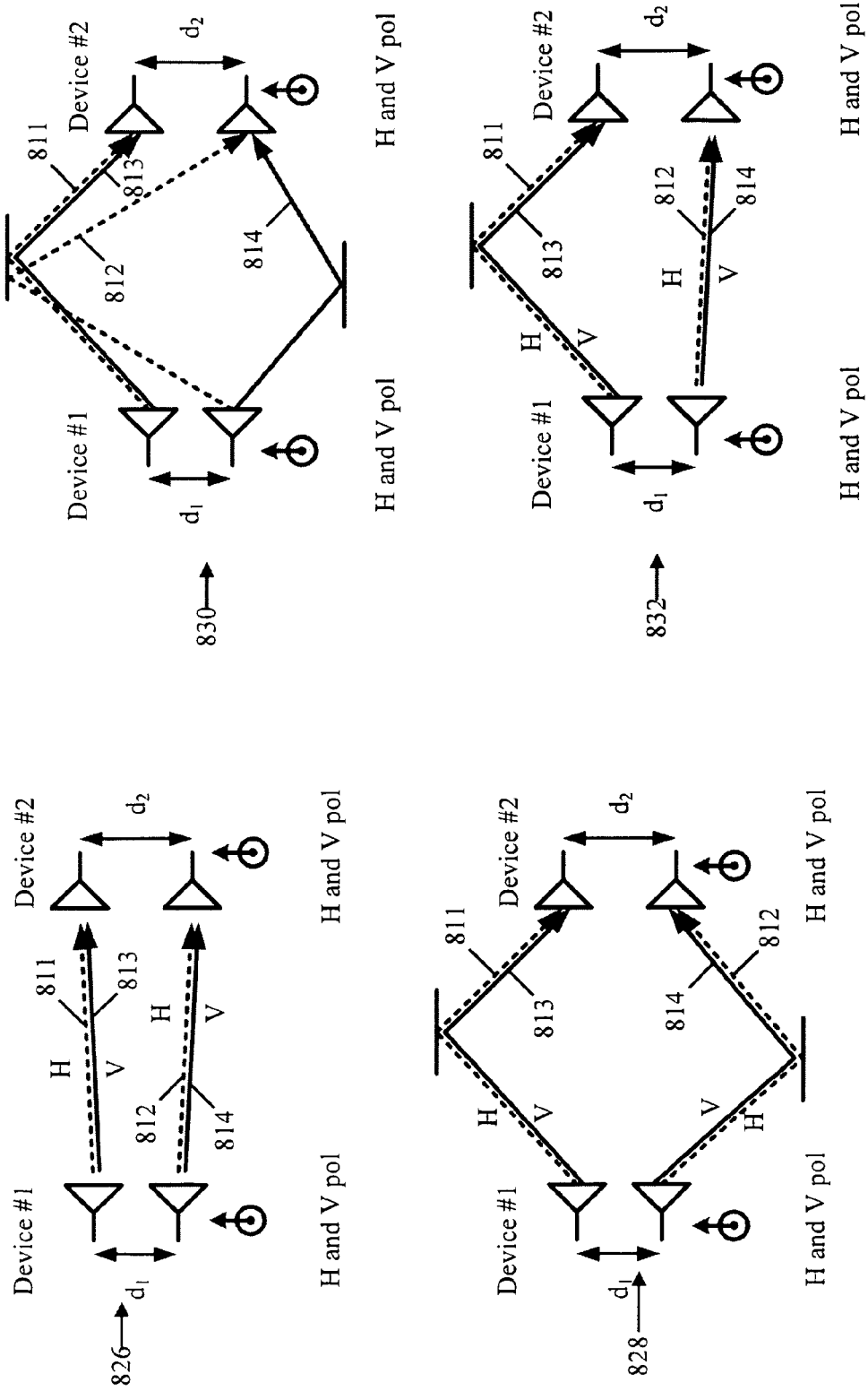
Fig. 8B – Examples of beamformed links

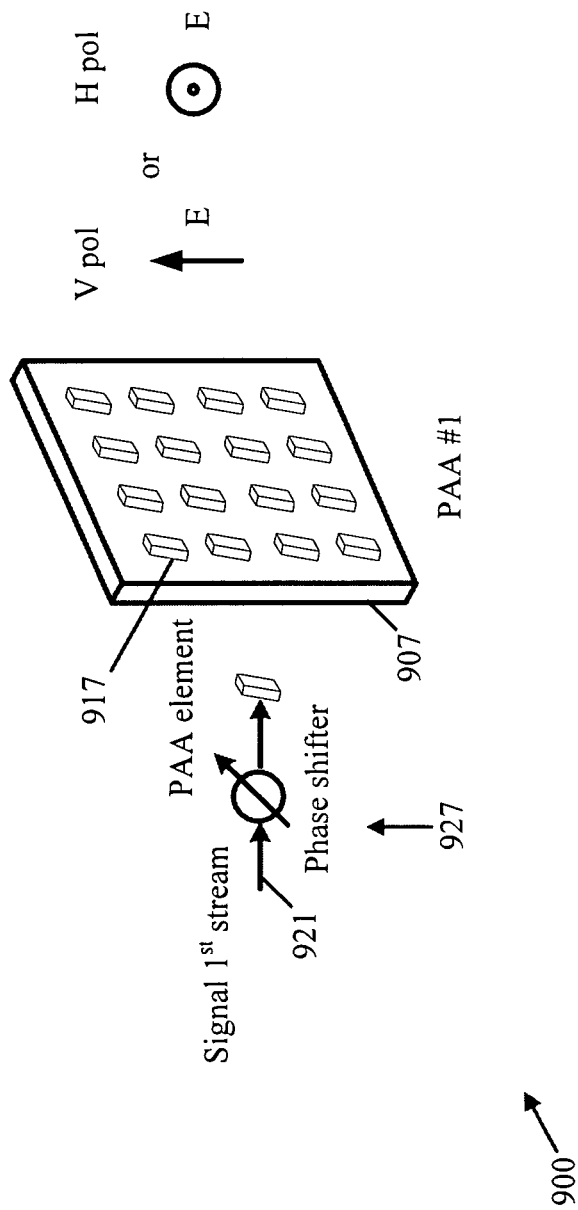
Fig. 9A – Device 1 MIMO scheme

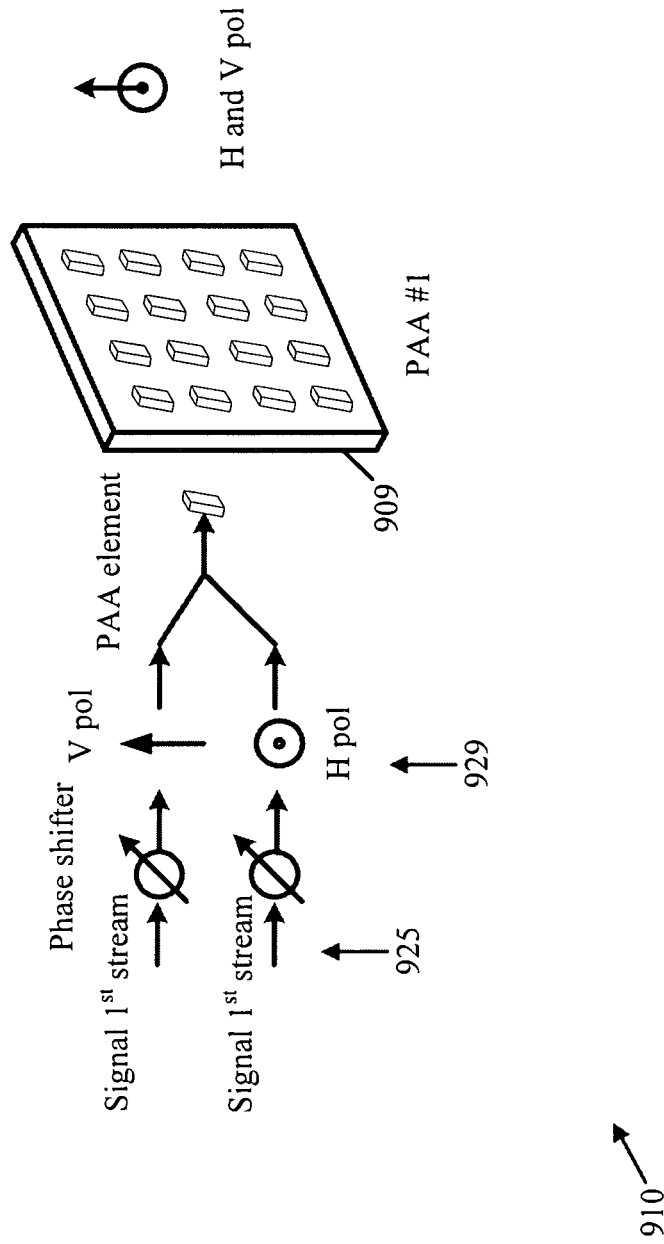
Fig. 9B – Device 2 MIMO scheme

APPARATUS, SYSTEM AND METHOD OF SINGLE-USER (SU) MULTI-IN-MULTI-OUT (MIMO) COMMUNICATION

CROSS REFERENCE

This application claims the benefit of and priority from U.S. Provisional Patent Application No. 62/200,059 entitled "APPARATUS, SYSTEM AND METHOD OF SINGLE-USER (SU) MULTI-IN-MULTI-OUT (MIMO) OVER A DIRECTIONAL BAND", filed Aug. 2, 2015, the entire disclosure of which is incorporated herein by reference.

TECHNICAL FIELD

Embodiments described herein generally relate to an apparatus, system and method of Single-User (Su) Multi-In-Multi-Out (MIMO) communication.

BACKGROUND

A wireless communication network in a millimeter-wave (mmWave) band may provide high-speed data access for users of wireless communication devices.

Communication over the mmWave may be performed via Phased Antenna Arrays (PAAs).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 5A is a schematic illustration of a single polarization MIMO configuration, FIG. 5B is a schematic illustration of beamformed links according to the MIMO configuration of FIG. 5A.

FIG. 6A is a schematic illustration of a dual polarization MIMO configuration, FIG. 6B is a schematic illustration of beamformed links according to the MIMO configuration of FIG. 6A.

FIG. 7A is a schematic illustration of a dual array MIMO configuration, FIG. 7B is a schematic illustration of beamformed links according to the MIMO configuration of FIG. 7A.

FIG. 8A is a schematic illustration of a dual array MIMO configuration, FIG. 8B is a schematic illustration of beamformed links according to the MIMO configuration of FIG. 8A.

FIG. 9A is a schematic illustration of a MIMO configuration of a first device according to a 1×2 MIMO scheme, FIG. 9B is a schematic illustration of a MIMO configuration of a second device according to the 1×2 MIMO scheme.

DETAILED DESCRIPTION

Figure 1:
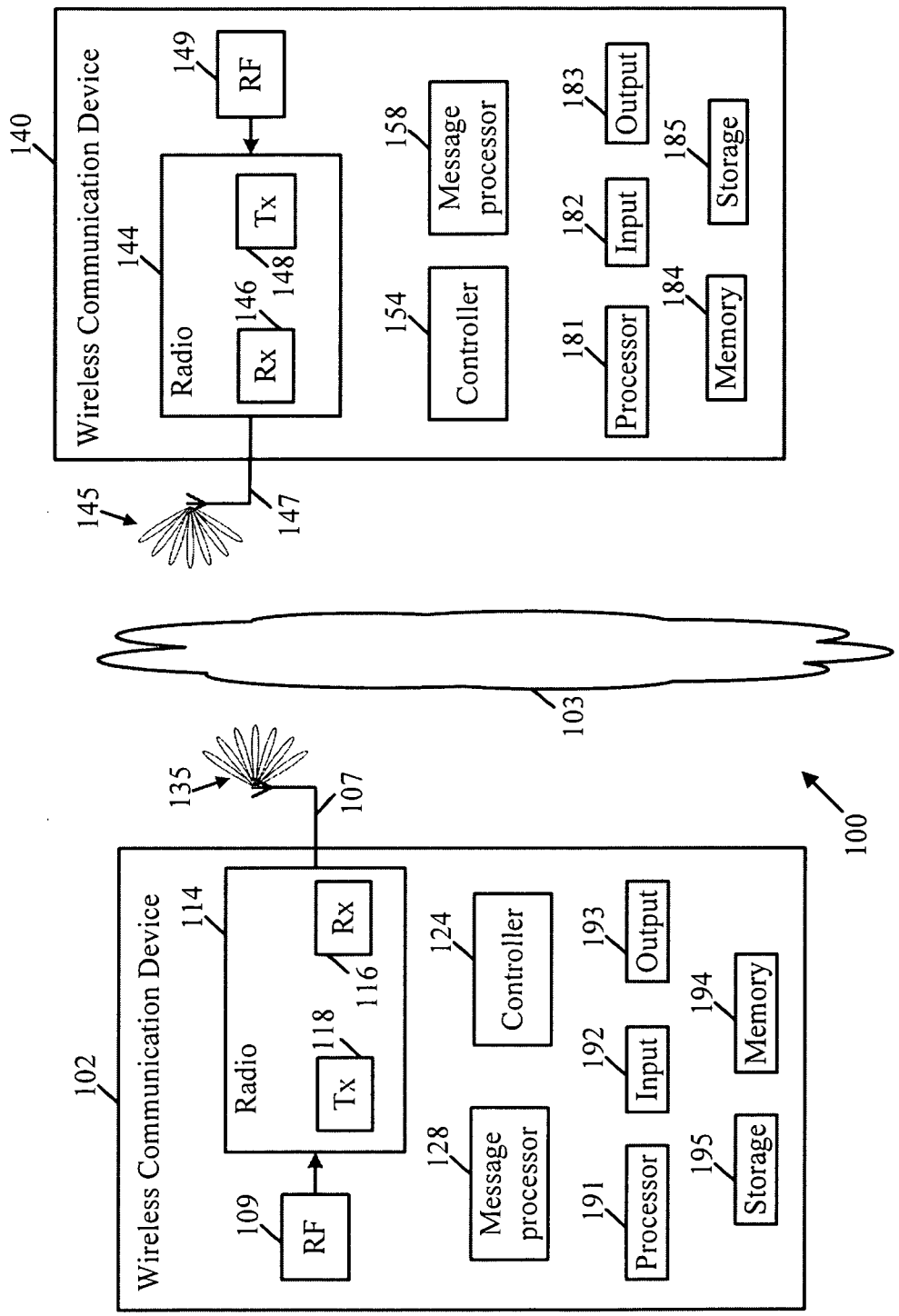
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.5, Aug. 4, 2015) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, shared) or memory/and, (or group, dedicated group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "millimeter-wave (mmWave) STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, wireless communication devices 102 and/or 140 may include a mobile device or a non-mobile, e.g., a static, device.

For example, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations (STA), e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WiFi STA, and the like.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radio 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, radios 114 and/or 144 may include, or may be associated with, a plurality of directional antennas.

In some demonstrative embodiments, device 102 may include a plurality of directional antennas 107, and/or device 140 may include a plurality of directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147, may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a number of PAAs per device, for example, an Access Point (AP), a laptop, and the like, may be limited to 2 PAA units, e.g., as described below. For example, antennas 107 and/or 147 may include a maximal number of two PAAs.

In other embodiments, any other number of PAAs may be used, e.g., more than two PAAs.

In some demonstrative embodiments, antennas 107 and/or 147 may be implemented as two PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, the values of M, and/or N may be determined and/or set, for example, according to suitable uses, implementations, and/or configurations.

In some demonstrative embodiments, the PAA may be configured to communicate a plurality of diversity streams.

In some demonstrative embodiments, the PAA may be configured to communicate one or more spatial streams.

In one example, the PAA may be configured to communicate a single spatial stream, In another example, the PAA may be configured to communicate two spatial streams, e.g., being spatially separate from each other.

In some demonstrative embodiments, PAA elements of a PAA may have a single linear polarization, e.g., a horizontal polarization or a vertical polarization, and/or a dual linear polarization, e.g., collocated horizontal polarization and vertical polarization.

In some demonstrative embodiments, antennas 107 and/or antennas 147 may be connected to, and/or associated with, a plurality of Radio Frequency (RF) chains.

In some demonstrative embodiments, device 102 may include a plurality of RF chains 109 connected to, and/or associated with, antennas 107.

In some demonstrative embodiments, device 140 may include a plurality of RF chains 149 connected to, and/or associated with, antennas 147.

In some demonstrative embodiments, device 102 and/or device 140 may include and/or may implement one or more configurations of antennas 107 and/or antennas 147, respectively, e.g., as described below with reference to FIGS. 2, 3, 4 and/or 5.

In some demonstrative embodiments, device 102 and/or device 140 may include one PAA or two PAAs. For example, antennas 107 and/or antennas 147 may include, and/or may be implemented as, one or two PAAs.

In some demonstrative embodiments, device 102 and/or device 140 may include a single PAA having a single polarization or a dual polarization. For example, antennas 107 and/or antennas 147 may include, and/or may be implemented as, a single PAA having a single polarization or a dual polarization.

In some demonstrative embodiments, device 102 and/or device 140 may include a single PAA having a single polarization. For example, antennas 107 and/or antennas 147 may include, and/or may be implemented as, a single PAA having a single polarization, e.g., as described below with reference to FIG. 2.

Figure 2:
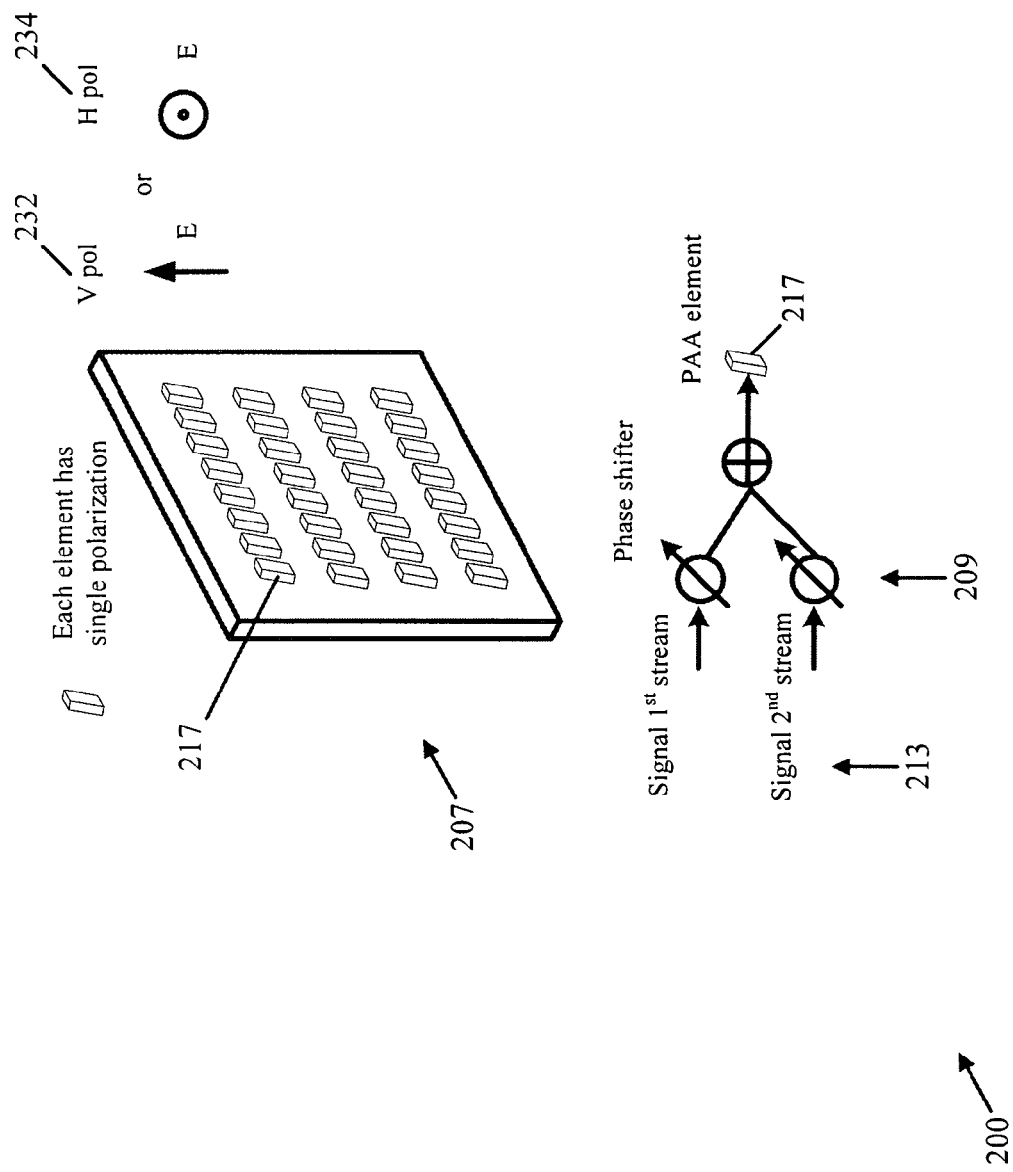
FIG. 2 is a schematic illustration of a Multi-Input-Multi-Out (MIMO) scheme using a single Phased Antenna Array (PAA) having a single polarization, in accordance with some demonstrative embodiments.

Reference is made to FIG. 2, which schematically illustrates a MIMO scheme 200 using a single PAA 207 having a single polarization, in accordance with some demonstrative embodiments. For example, antennas 107 and/or 147 (FIG. 1) may include and/or may be implanted as PAA 207.

In some demonstrative embodiments, as shown in FIG. 2, PAA 207 may include a single array of a size 4×8, e.g., including antenna elements arranged in 4 rows and 8 columns. In other embodiments, PAA 207 may include a single array of any other size.

In some demonstrative embodiments, as shown in FIG. 2, a PAA element 217 of PAA 207 may be connected to and/or associated with two supply chains 209, for example, to communicate two transmit MIMO streams 213.

In some demonstrative embodiments, as shown in FIG. 2, PAA 207 may be configured to communicate using a single polarization, e.g., either a vertical polarization 232 or a horizontal polarization 234.

Referring back to FIG. 1, in some demonstrative embodiments, device 102 and/or device 140 may include a single PAA having a dual polarization. For example, antennas 107 and/or antennas 147 may include, and/or may be implemented as, a single PAA having a dual polarization, e.g., as described below with reference to FIG. 3.

Figure 3:
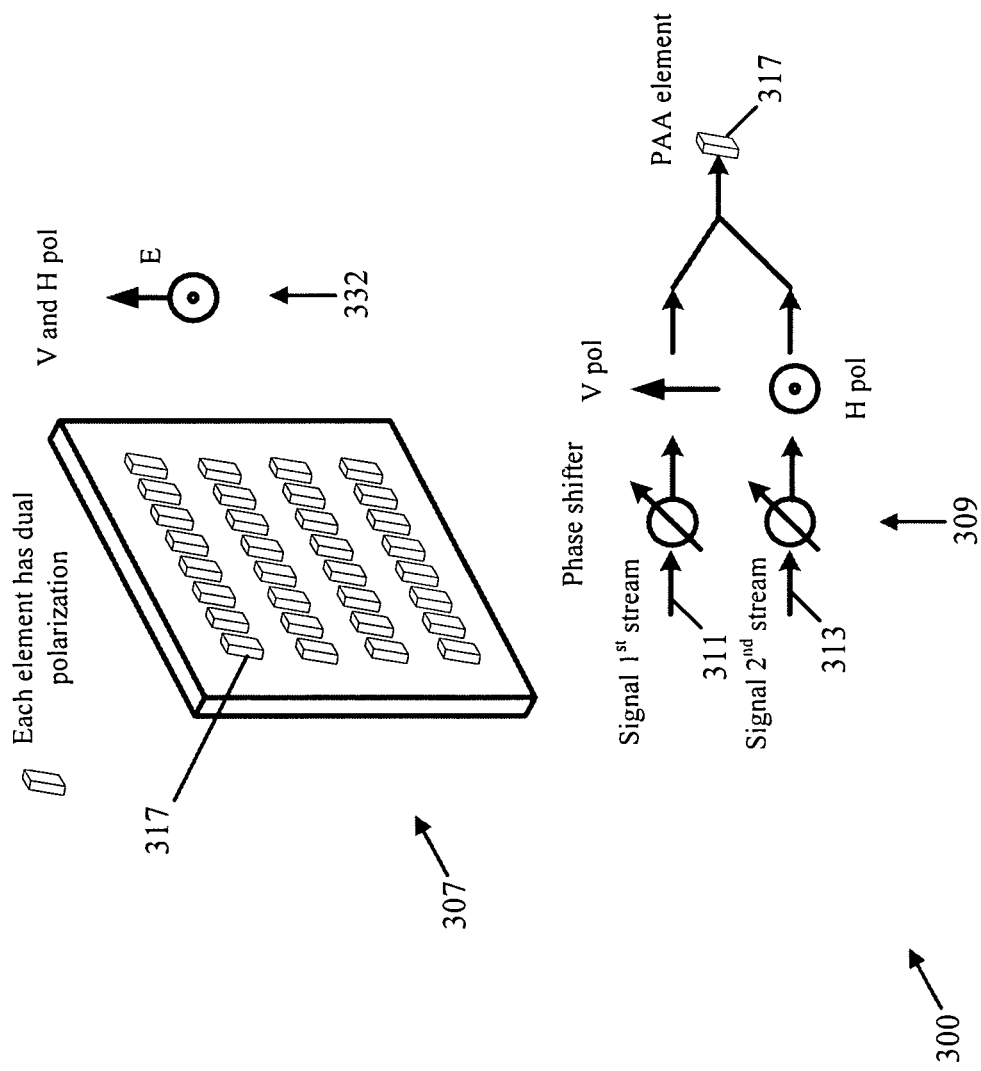
FIG. 3 is a schematic illustration of a Multi-Input-Multi-Out (MIMO) scheme using a single Phased Antenna Array (PAA) having a dual polarization, in accordance with some demonstrative embodiments.

Reference is made to FIG. 3, which schematically illustrates a MIMO scheme 300 using a single PAA 307 having a dual polarization, in accordance with some demonstrative embodiments. For example, antennas 107 and/or 147 (FIG. 1) may include and/or may be implanted as PAA 307.

In some demonstrative embodiments, as shown in FIG. 3, PAA 307 may include a single array of size 4×8. In other embodiments, PAA 307 may include a single array of any other size.

In some demonstrative embodiments, as shown in FIG. 3, a PAA element 317 of PAA 307 may be connected to and/or associated with two supply chains 309, for example, to communicate a first transmit MIMO stream 311, and a second transmit MIMO stream 313.

In some demonstrative embodiments, as shown in FIG. 3, PAA 307 may be configured to communicate using a dual polarization 332, e.g., using both a vertical polarization and a horizontal polarization.

In some demonstrative embodiments, as shown in FIG. 3, each PAA element 317 may have dual linear polarization, e.g., both H (horizontal) and V (vertical).

In some demonstrative embodiments, MIMO scheme 300 may be configured, for example, to exploit a polarization diversity property, and may enable to assign, for example, two streams to different H and V polarizations.

In some demonstrative embodiments, as shown in FIG. 3, first transmit MIMO stream 311 may be communicated using a vertical polarization, and/or second transmit MIMO stream 313 may be communicated using a horizontal polarization.

In some demonstrative embodiments, a beamforming algorithm for PAA 307 in a Non Line Of Sight (NLOS) environment may enable using a single reflection (one spatial directional beam) for both streams 311 and 313, or two strong reflections (two spatial directional beams), e.g., as described below with reference to FIG. 6B.

In some demonstrative embodiments, the beamforming algorithm for PAA 307 may configure communication of the streams 311 and 313 via the single reflection or the two strong reflections, for example, by using phase shifters.

Referring back to FIG. 1, in some demonstrative embodiments, device 102 and/or device 140 may include K physically independent PAAs. For example, antennas 107 and/or antennas 147 may include, and/or may be implemented as K physically independent PAAs.

In some demonstrative embodiments, device 102 and/or device 140 may include two PAAs. For example, antennas 107 and/or antennas 147 may include, and/or may be implemented as two PAAs.

In some demonstrative embodiments, device 102 and/or device 140 may include two PAAs having a single polarization or a dual polarization. For example, antennas 107 and/or antennas 147 may include, and/or may be implemented as, two PAAs having a single polarization or a dual polarization, e.g., as described below with reference to FIG. 4.

Figure 4:
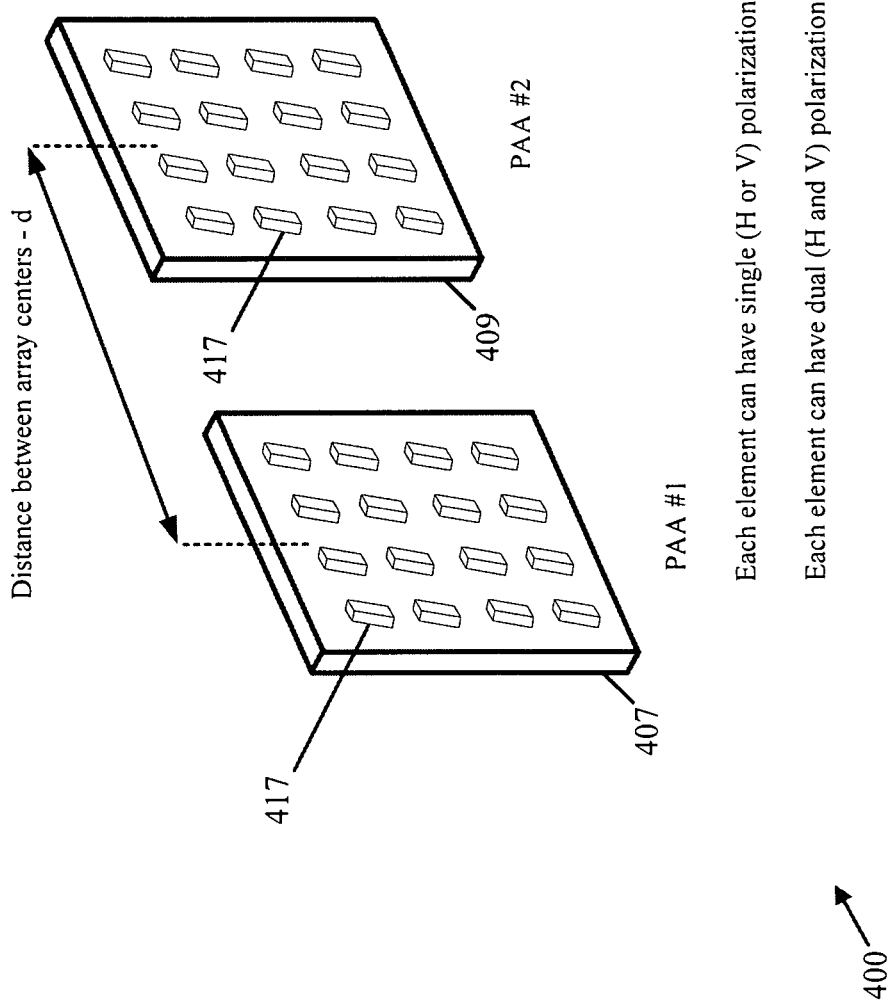
FIG. 4 is a schematic illustration of a Multi-Input-Multi-Out (MIMO) scheme using two Phased Antenna Arrays (PAAs) having a dual polarization or a single polarization, in accordance with some demonstrative embodiments.

Reference is made to FIG. 4, which schematically illustrates a MIMO scheme 400 using two PAAs, e.g., a first PAA 407 and a second PAA 409, having a dual polarization or a single polarization, in accordance with some demonstrative embodiments. For example, antennas 107 and/or 147 (FIG. 1) may include and/or may be implemented as PAA 407 and/or PAA 409.

In some demonstrative embodiments, as shown in FIG. 4, PAA 407 and/or PAA 409 may include a single array of size 4×8. In other embodiments, PAA 407 and/or PAA 409 may include a single array of any other size.

In some demonstrative embodiments, as shown in FIG. 4, a PAA element 417 of PAA 407 and/or PAA 409 may be configured to communicate using a dual polarization or a single polarization.

In some demonstrative embodiments, as shown in FIG. 4, PAA 407 and/or PAA 409 may have a dual linear polarization, e.g., including both H (horizontal) and V (vertical) polarizations or a single linear polarization, e.g., an H (horizontal) or a V (vertical) polarization.

In some demonstrative embodiments, as shown in FIG. 4, PAA 407 and PAA 409 may be separated by a distance d, e.g., between centers of PAA 407 and PAA 409.

In some demonstrative embodiments, MIMO scheme 400 may enable a 4×4 MIMO scheme, e.g., to communicate 4 spatial streams, for example, if PAA 407 and PAA 409 use the dual polarization.

In some demonstrative embodiments, PAA 407 and/or PAA 409 may be configured to perform an independent beamforming search, or a cooperative search to find a best channel realization.

Referring back to FIG. 1, in some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multi-In-Multi-Out (MIMO) communication, for example, for communicating over the NG60 and/or EDMG networks.

In some demonstrative embodiments, devices 102 and/or 140 may be configured according to one or more standards, for example, according to an IEEE 802.11ay Standard, which may be, for example, configured to enhance the efficiency and/or performance of an IEEE 802.1 ad Specification, which may be configured to provide WiFi connectivity in a 60 GHz band.

Some demonstrative embodiments may enable, for example, to significantly increase the data transmission rates defined in the IEEE 802.11ad specification, for example, from 7 Gbps up to 30 Gbps, or to any other data rate, which may, for example, satisfy growing demand in network capacity for new coming applications.

In some demonstrative embodiments, the IEEE 802.11 ad-2012 Specification, may be configured to support a Single User (SU) system, in which a Station (STA) may transmit frames to a single STA at a time.

Some demonstrative embodiments may enable, for example, communication in one or more use cases, which may include, for example, a wide variety of indoor and/or outdoor applications, including but not limited to, for example, at least, high speed wireless docking, ultra-short range communications, 8K Ultra High Definition (UHD) wireless transfer at smart home, augmented reality headsets and high-end wearables, data center inter-rack connectivity, mass-data distribution or video on demand system, mobile offloading and multi-band operation, mobile front-hauling, and/or wireless backhaul.

In some demonstrative embodiments, a communication scheme may include Physical layer (PHY) and/or Media Access Control (MAC) layer schemes, for example, to support one or more applications, and/or increased transmission data, rates, e.g., data rates of up to 30 Gbps.

In some demonstrative embodiments, the PHY and/or MAC layer schemes may be configured to support frequency channel bonding, mmWave (60 GHz band) Single User (SU) techniques, and/or Multi User (MU) MIMO techniques.

In some demonstrative embodiments, devices 102 and/or 140 may be configured to implement one or more SU mechanisms, which may be configured to enable SU communication of Downlink (DL) and/or Uplink frames (UL) using a MIMO scheme.

In some demonstrative embodiments, devices 102 and/or 140 may be configured to communicate over a millimeter-wave (mmWave) wireless communication band, e.g., in accordance with the IEEE 802.1 ad specification. For example, devices 102 and/or 140 may be configured to communicate MIMO communications over the mmWave wireless communication band.

In some demonstrative embodiments, devices 102 and/or 140 may be configured to communicate over a Next Generation 60 GHz (NG60) network, an Extended DMG (EDMG) network, and/or any other network and/or any other frequency band. For example, devices 102 and/or 140 may be configured to communicate DL SU-MIMO transmissions and/or UL SU-MIMO transmissions, for example, for communicating over the NG60 and/or EDMG networks.

In some demonstrative embodiments, devices 102 and/or 140 may be configured to implement one or more techniques, which may, for example, enable to support communications over a MIMO communication channel, e.g., a SU-MIMO channel between two mmWave STAs.

In some demonstrative embodiments, devices 102 and/or 140 may be configured to use an antenna polarization scheme configured to support communication over a MIMO communication channel between two mmWave STAs.

In some demonstrative embodiments, devices 102 and/or 140 may be configured to communicate according to one or more SU-MIMO configurations, e.g., as described below.

In some demonstrative embodiments, the SU-MIMO configurations may be implemented in a definition of transmission modes, e.g., to be used by one or more future standards, beamforming algorithms, MIMO scheme performance, and/or channel modeling.

In some demonstrative embodiments, a plurality of SU-MIMO configurations may be defined, for example, to be used by two devices to perform a MIMO transmission over a directional band, e.g., a DMG band.

In some demonstrative embodiments, a set of 5 SU-MIMO configurations may be predefined, e.g., as described below.

In some demonstrative embodiments, the set of 5 SU-MIMO configurations may enable using up to 4 transmit streams, for example, to exploit spatial and/or polarization diversity channel properties, and/or to allow system operation in Line of Sight (LOS) and/or non-LOS (NLOS) environments, e.g., as described below.

In other embodiments, any other set of SU-MIMO configurations may be predefined, for example, to include only part of the plurality of the SU-MIMO configurations and/or schemes, and/or to include one or more additional or alternative SU-MIMO configurations and/or schemes.

In some demonstrative embodiments, the set of 5 SU-MIMO configurations be defined to include one or more of, e.g., all of, the following SU MIMO configurations:

according to suitable uses, implementations, and/or configurations.

In some demonstrative embodiments, in accordance with Table 1, the SU MIMO configurations may define, for example, at least a number of data streams, a number of PAAs to be used by first and/or second devices, a polarization type to be applied at the first and/or second devices, and/or a number of Radio-Frequency (RF) chains per PAA to be used by the first and/or second devices, e.g., as described below.

In some demonstrative embodiments, the SU-MIMO configurations defined by Table 1 may define a MIMO configuration to be used by a first device ("Device 1"), e.g., device 102, to communicate an SU-MIMO communication with a second device ("Device 2"), e.g., device 140.

For example, a first SU-MIMO configuration ("SU-MIMO configuration #1") may be configured to communicate a 2×2 MIMO communication between the Device 1 and the Device 2. For example, according to the SU-MIMO configuration #1 the 2×2 MIMO communication may include two data streams. For example, the Device 1 may use a single PAA with a single polarization, e.g., according to MIMO scheme 200 (FIG. 2), and Device 2 may use a single PAA with a single polarization, e.g., according to MIMO scheme 200 (FIG. 2). For example, the Device 1 may use two RF chains per the single PAA, and the Device 2 may use two RF chains per the single PAA. The SU-MIMO configuration #1 may allow to communicate the MIMO communication using, for example, two Non Line of Sight (NLOS) beams, e.g., as described below.

For example, a second SU-MIMO configuration ("SU-MIMO configuration #2") may be configured to communicate a 2×2 MIMO communication between the Device 1 and the Device 2. For example, according to the SU-MIMO configuration #2 the 2×2 MIMO communication may include two data streams. For example, the Device 1 may use a single PAA with a dual polarization, e.g., according to MIMO scheme 300 (FIG. 3), and Device 2 may use a single

TABLE 1

| # | Number of data streams | MIMO configuration | Number of PAAs (Device 1, Device 2) | Polarization type (Device 1, Device 2) | PAAs separation (Device 1, Device 2) | Number of RF parts per PAA (Device 1, Device 2) | LOS | NLOS | Mandatory/ optional |
|---|---|---|---|---|---|---|---|---|---|
| 1 | 2 | 2 × 2 | (1, 1) | (Single, single) | (0, 0) | (2, 2) | No | Yes | Optional |
| 2 | 2 | 2 × 2 | (1, 1) | (Dual, dual) | (0, 0) | (2, 2) | Yes | Yes | Mandatory |
| 3 | 2 | 2 × 2 | (2, 2) | (Single, single) | $(d_1, d_2)$ | (1, 1) | Yes | Yes | Mandatory |
| 4 | 4 | 4 × 4 | (2, 2) | (Dual, dual) | $(d_1, d_2)$ | (2, 2) | Yes | Yes | Optional |
| 5 | 1 | 1 × 2 | (1, 2) | (Single, dual) | (0, 0) | (1, 2) | Yes | Yes | Mandatory |

In some demonstrative embodiments, as shown in Table 1, five different SU-MIMO configurations, denoted Configurations #1-#5, respectively, may be defined, e.g., as described below.

In some demonstrative embodiments, the distance d may denote a distance between geometrical centers of the PAAs, e.g., in case of 2 PAAs per device, e.g., PAA 407 and PAA 409 (FIG. 4). A zero distance may indicate use of a single PAA unit.

In some demonstrative embodiments, the value of the distance d may be determined and/or set, for example, PAA with a dual polarization, e.g., according to MIMO scheme 300 (FIG. 3). For example, the Device 1 may use two RF chains per the single PAA, and the Device 2 may use two RF chains per the single PAA. The SU-MIMO configuration #2 may allow to communicate the MIMO communication using, for example, two NLOS beams or two LOS beams, e.g., as described below.

For example, a third SU-MIMO configuration ("SU-MIMO configuration #3") may be configured to communicate a 2×2 MIMO communication between the Device 1 and the Device 2. For example, according to the SU-MIMO configuration #3 the 2×2 MIMO communication may include two data streams. For example, the Device 1 may use a dual PAA with a single polarization, e.g., according to MIMO scheme 400 (FIG. 4), and Device 2 may use a dual PAA with a single polarization, e.g., according to MIMO scheme 400 (FIG. 4). For example, the Device 1 may use one RF chain per PAA of the dual PAA, and the Device 2 may use one RF chain per PAA of the dual PAA. The SU-MIMO configuration #3 may allow to communicate the MIMO communication using, for example, two NLOS beams or two LOS beams, e.g., as described below.

For example, a fourth SU-MIMO configuration ("SU-MIMO configuration #4") may be configured to communicate a 4×4 MIMO communication between the Device 1 and the Device 2. For example, according to the SU-MIMO configuration #4 the 4×4 MIMO communication may include four data streams. For example, the Device 1 may use a dual PAA with a dual polarization, e.g., according to MIMO scheme 400 (FIG. 4), and Device 2 may use a dual PAA with a dual polarization, e.g., according to MIMO scheme 400 (FIG. 4). For example, the Device 1 may use two RF chains per PAA of the dual PAA, and the Device 2 may use two RF chains per PAA of the dual PAA. The SU-MIMO configuration #4 may allow to communicate the MIMO communication using, for example, four beams including a combination of NLOS beams and/or LOS beams, e.g., as described below.

For example, a fifth SU-MIMO configuration ("SU-MIMO configuration #5") may be configured to communicate a 1×2 MIMO communication between the Device 1 and the Device 2. For example, according to the SU-MIMO configuration #5 the 1×2 MIMO communication may include a single data stream. For example, the Device 1 may use a single PAA with a single polarization, e.g., according to MIMO scheme 200 (FIG. 2), and Device 2 may use a single PAA with a dual polarization, e.g., according to MIMO scheme 300 (FIG. 3). For example, the Device 1 may use one RF chain per the single PAA, and the Device 2 may use two RF chains per the single PAA. The SU-MIMO configuration #5 may allow to communicate the MIMO communication using, for example, one NLOS beam or one LOS beam, e.g., as described below.

In some demonstrative embodiments, one or more of the MIMO configurations of Table 1 may be defined to be mandatory, and/or one or more of the MIMO configurations of Table 1 may be defined to be optional. For example, a device, e.g., device 102 and/or device 140, may be required to implement a mandatory MIMO configuration; and/or a device, e.g., device 102 and/or device 140, may be allowed to implement or not to implement an optional MIMO configuration. Table 1 defines one or more MIMO configurations as mandatory and one or more MIMO configurations as optional, in accordance with some demonstrative embodiments. In other embodiments, one or more of the MIMO configurations, which are defined in Table 1 as mandatory, may be defined as optional, and/or one or more of the MIMO configurations, which are defined in Table 1 as optional, may be defined as mandatory.

In some demonstrative embodiments, the SU-MIMO configurations of Table 1 may be based on a plurality of SU-MIMO schemes, e.g., as described below. The SU-MIMO schemes may be configured to allow, for example, performing analog Radio Frequency (RF) beamforming for setting up weights, e.g., phases and/or amplitudes, of the PAA; or hybrid RF and Baseband (BB) beamforming, e.g., while using digital beamforming (precoding).

In some demonstrative embodiments, the SU-MIMO configurations of Table 1 may have reduced or limited complexity. Accordingly, the SU-MIMO configurations of Table 1 may be suitable, for example, for implementation in systems, e.g., mmWave (60 GHz) systems, in which a number of RF chains may be limited, for example, due to expensive implementation and/or power consumption issues.

In some demonstrative embodiments, the SU-MIMO configurations of Table 1 may allow, for example, applying one or more MIMO techniques including, but not limited to, one or more of Maximum Ratio Combining (MRC) robust transmission; Open-Loop (OL) MIMO/Space Time Block Coding (STBC), for example, based on an optimal selection from Open Loop (OL) MIMO, e.g., two streams, double rate, and/or Alamouti space-time coding scheme; Closed-Loop (CL) MIMO, for example, Singular Value Decomposition (SVD) fine subcarrier-wise beamforming, and/or the like.

In some demonstrative embodiments, two devices, e.g., devices 102 and 140, may be configured to communicate a SU-MIMO transmission, for example, according to a SU-MIMO configuration, e.g., a SU-MIMO configuration of the SU-MIMO configurations of Table 1.

In some demonstrative embodiments, controller 124 may be configured to cause, trigger and/or control device 102 to configure at least one PAA of device 102 according to a predefined SU-MIMO configuration. For example, controller 124 may be configured to cause, trigger and/or control device 102 to configure antennas 107, e.g., implemented as one PAA or two PAAs, according to an SU-MIMO configuration of the SU-MIMO configurations of Table 1, for example, the SU MIMO Configuration #3 of Table 1.

In some demonstrative embodiments, controller 154 may be configured to cause, trigger and/or control device 140 to configure at least one PAA of device 140 according to a predefined SU-MIMO configuration. For example, controller 124 may be configured to cause, trigger and/or control device 140 to configure antennas 107, e.g., implemented as one PAA or two PAAs, according to an SU-MIMO configuration of the SU-MIMO configurations of Table 1, for example, the SU MIMO Configuration #3 of Table 1.

In some demonstrative embodiments, the SU MIMO configuration of device 102 may include at least a number of data streams, a number of PAAs to be used by device 102, and/or a polarization type to be applied at antennas 107, e.g., as described above with respect to Table 1.

In some demonstrative embodiments, the SU MIMO configuration of device 140 may include at least a number of PAAs to be used by device 140, a polarization type to be applied at antennas 147, and/or a number of RF chains 149, e.g., as described above with respect to Table 1.

In some demonstrative embodiments, the SU MIMO configuration of device 102 may include at least a number of RF chains 109.

In some demonstrative embodiments, the number of data streams may include one stream, two streams, or four streams, e.g., as described above with respect to Table 1.

In some demonstrative embodiments, the at least one PAA may include one PAA, e.g., as described above with reference to FIGS. 2 and/or 3, or two PAAs, e.g., as described above with reference to FIG. 4.

In some demonstrative embodiments, the polarization type may include a single polarization or a dual polarization, e.g., as described above with reference to FIGS. 2 and/or 3.

In some demonstrative embodiments, controller 124 may be configured to cause, trigger and/or control device 102 and/or transmitter 118 to transmit an SU MIMO transmission to device 140 via the at least one PAA of device 102 over a directional wireless communication band.

In some demonstrative embodiments, device 140 may receive the SU MIMO transmission from device 102.

In some demonstrative embodiments, controller 154 may be configured to cause, trigger and/or control device 140 and/or receiver 146 to receive the SU MIMO transmission at device 140 via the at least one PAA of device 140 over the directional wireless communication band.

In some demonstrative embodiments, devices 102 and/or 140 may be configured to communicate according to the SU MIMO Configuration #1 of Table 1, as described below.

In some demonstrative embodiments, according to the SU MIMO Configuration #1, both devices 102 and 140 may use a single array with a single polarization and two spatial streams. For example, both devices 102 and 140 may use MIMO scheme 200 (FIG. 2).

In some demonstrative embodiments, the SU MIMO configuration may include a single PAA, two data streams and a single polarization.

For example, antennas 107 and/or 147 may include, and/or may be implemented as, a single PAA having a single polarization, and/or RF chains 109 and/or 149 may include two RF chains to communicate two data streams.

In some demonstrative embodiments, antennas 107 and/or 147 may include a single array MIMO using a single PAA of an M×N rectangular geometry. All PAA elements may have an identical linear polarization of type H (horizontal) or V (vertical).

In some demonstrative embodiments, controller 124 may be configured to cause, trigger and/or control device 102 to transmit the SU MIMO transmission by the single PAA of device 102 via two respective directional beams, (also referred to as "beamformed links") having a same polarization.

In some demonstrative embodiments, the two directional beams may include two Non Line of Sight (NLOS) beams.

In some demonstrative embodiments, controller 144 may be configured to cause, trigger and/or control device 140 to receive the two streams of the SU MIMO transmission by the single PAA of device 140 via two respective directional beams having the same polarization.

In some demonstrative embodiments, each PAA element of antennas 107 and/or 147 may be fed with a superposition of weighted (or phase shifted) signals pertained to the two directional beams to create a desired resulting antenna pattern, e.g., having two NLOS beams.

In some demonstrative embodiments, the SU MIMO Configuration #1 may exploit a spatial channel diversity property, and/or may separate the streams in the space domain, for example, to enable maximizing a received power (finding strong reflector) and/or minimizing the impact of each stream on other streams (interference suppression), e.g., as described below with reference to FIGS. 5A, 5B and 5C.

Figure 5C:
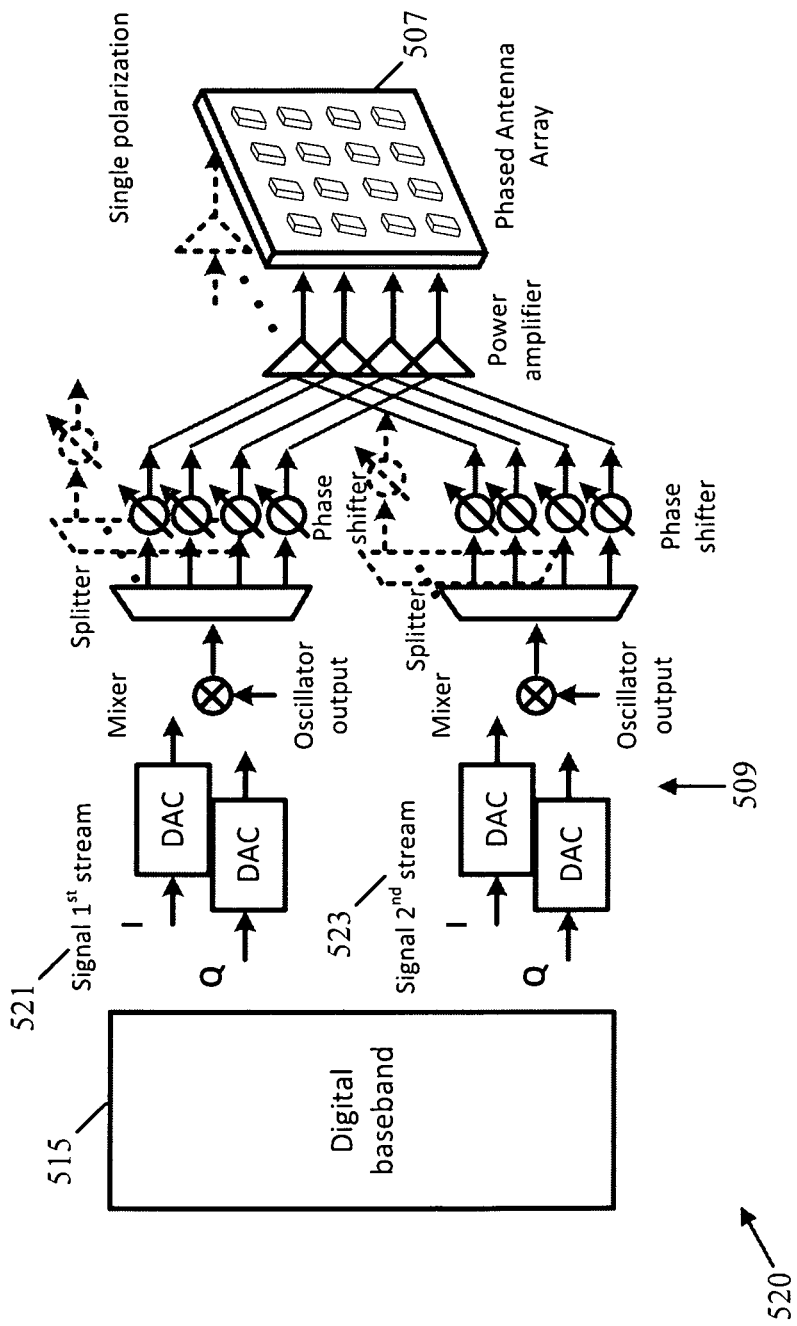
FIG. 5C is a schematic illustration of a radio configured to communicate according to the MIMO configuration of FIG. 5A, in accordance with some demonstrative embodiments.

Reference is made to FIG. 5A, which schematically illustrates an SU MIMO configuration 500, e.g., according to the SU MIMO Configuration #1, FIG. 5B, which schematically illustrates beamformed links 510 according to SU MIMO configuration 500, and FIG. 5C, which schematically illustrates a radio 520 configured to communicate according to SU MIMO configuration 500, in accordance with some demonstrative embodiments.

In some demonstrative embodiments, devices 102 and 140 (FIG. 1) may be configured to communicate according to SU-MIMO configuration 500, e.g., as described below.

In some demonstrative embodiments, as shown in FIG. 5A, SU MIMO configuration 500 may include a single PAA 507 having a single polarization. For example, PAA 507 may perform the functionality of single PAA 207 (FIG. 2).

In one example, antennas 107 and/or 147 (FIG. 1) may include and/or may be implemented as single PAA 507.

In some demonstrative embodiments, as shown in FIG. 5A, a PAA element 517 of single PAA 507 may be connected to and/or associated with two supply chains 509, for example, to communicate a first data stream 521 and a second data stream 523, for example, via two beamformed links.

In some demonstrative embodiments, as shown in FIG. 5B, a first device ("device 1"), e.g., device 102 (FIG. 1), and a second device ("device 2"), e.g., device 140 (FIG. 1), may communicate the first data stream 521 and the second data stream 523 over a first beamformed link 511 and a second beamformed link 513, respectively.

In some demonstrative embodiments, as shown in FIG. 5B, in a first scheme 526 first beamformed link 511 and second beamformed link 513 may include two NLOS beams.

In some demonstrative embodiments, as shown in FIG. 5B, in a second scheme 528 first beamformed link 511 may include a NLOS beam, and second beamformed link 513 may include a LOS beam.

In some demonstrative embodiments, as shown in FIG. 5C, radio 520, e.g., radio 114 and/or radio 155 (FIG. 1), may include one or more components, and/or elements, according to SU MIMO configuration 500.

In some demonstrative embodiments, as shown in FIG. 5C, radio 520 may include single PAA 507, two supply chains 509 and/or a digital baseband 515, for example, configured to process, provide, and/or communicate the first data stream 521 and the second data stream 523.

Referring back to FIG. 1, in some demonstrative embodiments, devices 102 and/or 140 may be configured to communicate according to an SU-MIMO scheme, e.g., the SU MIMO Configuration #2 of Table 1, which may include a single array MIMO with dual polarization, e.g., as described below.

In some demonstrative embodiments, according to SU MIMO Configuration #2, both devices 102 and 140 may use a single array with dual polarization and two spatial streams. For example, both devices 102 and 140 may use MIMO scheme 300 (FIG. 3).

In some demonstrative embodiments, the SU MIMO configuration, e.g., SU MIMO Configuration #2, may include a single PAA, two data streams and a dual polarization.

For example, antennas 107 and/or 147 may include, and/or may be implemented as, a single PAA having a dual polarization, and/or RF chains 109 and/or 149 may include two RF chains to communicate two data streams.

In some demonstrative embodiments, antennas 107 and/or 147 may include a single array MIMO using a single. PAA of an M×N rectangular geometry. All PAA elements may have both linear polarizations of type H (horizontal) and V (vertical).

In some demonstrative embodiments, controller 124 may be configured to cause, trigger and/or control device 102 to transmit the SU MIMO transmission by the single PAA of device 102 via two respective directional beams.

In some demonstrative embodiments, the two directional beams may have two respective different polarizations.

In some demonstrative embodiments, the two directional beams may include two Line of Sight (LOS) beams.

In some demonstrative embodiments, controller 144 may be configured to cause, trigger and/or control device 140 to receive the SU MIMO transmission by the single PAA of device 140 via the two respective directional beams having the different polarization.

In some demonstrative embodiments, each PAA element of antennas 107 and/or 147 may be fed with a superposition of weighted (or phase shifted) signals pertained to the two directional beams to create a desired resulting antenna pattern, e.g., having two LOS and/or NLOS beams, e.g., as described below with reference to FIGS. 6A, 6B and 6C.

Figure 6C:
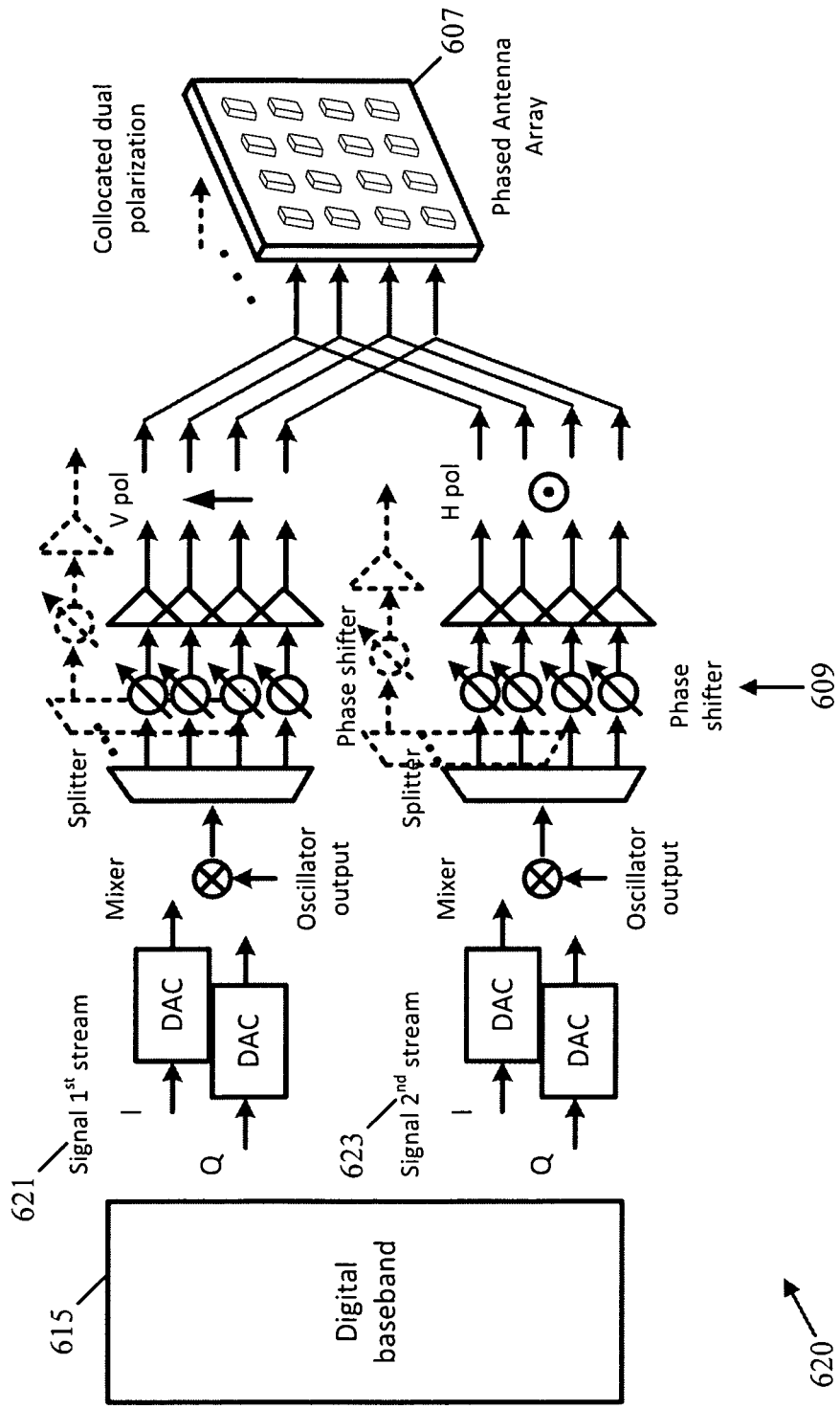
FIG. 6C is a schematic illustration of a radio configured to communicate according to the MIMO configuration of FIG. 6A, in accordance with some demonstrative embodiments.

Reference is made to FIG. 6A, which schematically illustrates an SU MIMO configuration 600, e.g., according to the SU MIMO Configuration #2, FIG. 6B, which schematically illustrates beamformed links 610 according to SU MIMO configuration 600, and FIG. 6C, which schematically illustrates a radio 620 configured to communicate according to SU MIMO configuration 600, in accordance with some demonstrative embodiments.

In some demonstrative embodiments, devices 102 and 140 (FIG. 1) may be configured to communicate according to SU-MIMO configuration 600, e.g., as described below.

In some demonstrative embodiments, as shown in FIG. 6A, SU MIMO configuration 600 may include a single PAA 607 having a dual polarization. For example, PAA 607 may perform the functionality of single PAA 307 (FIG. 3).

In one example, antennas 107 and/or 147 (FIG. 1) may include and/or may be implemented as single PAA 607.

In some demonstrative embodiments, as shown in FIG. 6A, a PAA element 617 of single PAA 607 may be connected to and/or associated with two supply chains 609, for example, to communicate a first data stream 621 and a second data stream 623, for example, via two respective beamformed links.

In some demonstrative embodiments, as shown in FIG. 6B, a first device ("device 1"), e.g., device 102 (FIG. 1), and a second device ("device 2"), e.g., device 140 (FIG. 1), may communicate the first data stream 621 and the second data stream 623 over a first beamformed link 611 and a second beamformed link 613, respectively.

In some demonstrative embodiments, communicating first data stream 621 and second data stream 623, for example, using two different polarization settings, may enable to communicate first data stream 621 and second data stream 623 via two respective LOS beams.

In some demonstrative embodiments, as shown in FIG. 6B, in a first scheme 626 first beamformed link 611 and second beamformed link 613 may include two respective LOS beams, e.g., having different polarization.

In some demonstrative embodiments, as shown in FIG. 6B, in a second scheme 628 first beamformed link 611 and second beamformed link 613 may include two respective NLOS beams, e.g., e.g., having the same polarization or different polarizations.

In some demonstrative embodiments, as shown in FIG. 6B, in a third scheme 630 first beamformed link 611 and second beamformed link 613 may include two respective NLOS beams, e.g., having different polarization, directed to the same direction.

In some demonstrative embodiments, as shown in FIG. 6B, in a fourth scheme 632 first beamformed link 611 may include a NLOS beam, and second beamformed link 613 may include a LOS beam, e.g., having the same polarization or different polarizations.

In some demonstrative embodiments, as shown in FIG. 6C, radio 620, e.g., radio 114 and/or radio 155 (FIG. 1), may include one or more components, and/or elements, according to SU MIMO configuration 600.

In some demonstrative embodiments, as shown in FIG. 6C, radio 620 may include single PAA 607, two supply chains 609 and/or a digital baseband 615, for example, configured to process, provide, and/or communicate first data stream 621 and second data stream 623.

Referring back to FIG. 1, in some demonstrative embodiments, devices 102 and/or 140 may be configured to communicate according to the SU MIMO Configuration #3 of Table 1, e.g., as described below.

In some demonstrative embodiments, according to the SU MIMO Configuration #3, both devices 102 and 140 may use a dual array with a single polarization and two spatial streams. For example, both devices 102 and 140 may use MIMO scheme 400 (FIG. 4).

In some demonstrative embodiments, the SU MIMO configuration, e.g., the SU MIMO Configuration #3, may include two PAAs, two data streams, a single polarization, and a distance between the two PAAs.

For example, antennas 107 and/or 147 may include, and/or may be implemented as, two PAAs having a single polarization and at a distance d between the two PAAs; and/or RF chains 109 and/or 149 may include two RF chains to communicate two data streams.

In some demonstrative embodiments, antennas 107 and/or 147 may include a dual array MIMO using a dual PAA each of an M×N rectangular geometry. All PAA elements may have a single polarization of linear polarization of type H (horizontal) or type V (vertical).

In some demonstrative embodiments, controller 124 may be configured to cause, trigger and/or control device 102 to transmit the SU MIMO transmission by the two PAA of device 102 via two respective directional beams.

In some demonstrative embodiments, the two directional beams may have the same polarization.

In some demonstrative embodiments, controller 144 may be configured to cause, trigger and/or control device 140 to receive the SU MIMO transmission by the two PAA of device 140 via the two respective directional beams having the same polarization.

Figure 7C:
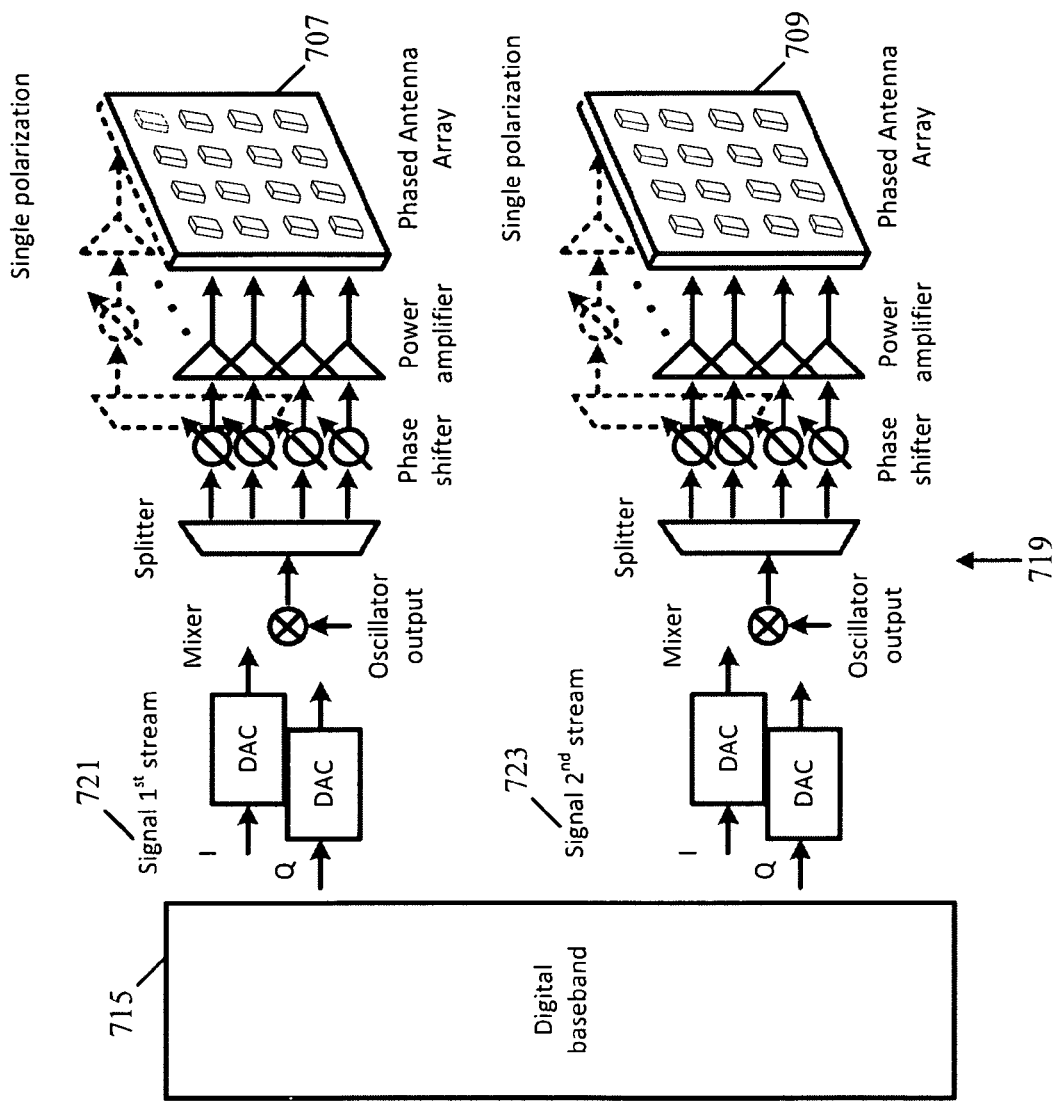
FIG. 7C is a schematic illustration of a radio configured to communicate according to the MIMO configuration of FIG. 7A, in accordance with some demonstrative embodiments.

Reference is made to FIG. 7A, which schematically illustrates an SU MIMO configuration 700, e.g., according to the SU MIMO Configuration #3, FIG. 7B, which schematically illustrates beamformed links 710 according to SU MIMO configuration 700, and FIG. 7C, which schematically illustrates a radio 720 configured to communicate according to SU MIMO configuration 700, in accordance with some demonstrative embodiments.

In some demonstrative embodiments, devices 102 and 140 (FIG. 1) may be configured to communicate according to SU-MIMO configuration 700, e.g., as described below.

In some demonstrative embodiments, as shown in FIG. 7A, SU MIMO configuration 700 may include a first PAA 707 and a second PAA 709, each having a single polarization. For example, first PAA 707 and second PAA 709 may perform the functionality of PAA 407 and/or PAA 409 (FIG. 4).

In one example, antennas 107 (FIG. 1) may include and/or may be implemented as two PAAs, e.g., PAA 407 and PAA 409 (FIG. 4); and/or antennas 147 (FIG. 1) may include and/or may be implemented as two PAAs, e.g., PAA 407 and PAA 409 (FIG. 4).

In some demonstrative embodiments, as shown in FIG. 7A, a PAA element 717 of PAA 707 may be connected to and/or associated with a supply chain 727, for example, to communicate a first data stream 721, for example, via a first beamformed link.

In some demonstrative embodiments, as shown in FIG. 7A, a PAA element 719 of PAA 709 may be connected to and/or associated with a supply chain 729, for example, to communicate a second data stream 723, for example, via a second beamformed link.

In some demonstrative embodiments, as shown in FIG. 7A, PAA 707 and PAA 709 may be separated by a distance d, e.g., between centers of PAA 707 and PAA 709.

In some demonstrative embodiments, as shown in FIG. 7B, a first device ("device 1"), e.g., device 102 (FIG. 1), and a second device ("device 2"), e.g., device 140 (FIG. 1), may communicate the first data stream 721 and the second data stream 723 over a first beamformed link 711 and a second beamformed link 713, respectively.

In some demonstrative embodiments, communicating first data stream 721 and second data stream 723, for example, using two respective PAAs, may enable to communicate first data stream 721 and second data stream 723 via two respective LOS beams, for example, even if a single polarization is used, for example, if the distance d between the two PAAs enables separation between first beamformed link 711 and second beamformed link 713.

In some demonstrative embodiments, as shown in FIG. 7B, in a first scheme 726 first beamformed link 711 and second beamformed link 713 may include two respective LOS beams, e.g., having the same polarization or different polarizations.

In some demonstrative embodiments, as shown in FIG. 7B, in a second scheme 728 first beamformed link 711 and second beamformed link 713 may include two respective NLOS beams, e.g., e.g., having the same polarization or different polarizations.

In some demonstrative embodiments, as shown in FIG. 7B, in a third scheme 730 first beamformed link 711 and second beamformed link 713 may include two respective NLOS beams, e.g., having the same polarization or different polarizations, directed to the same direction.

In some demonstrative embodiments, as shown in FIG. 7B, in a fourth scheme 732 first beamformed link 711 may include a NLOS beam, and second beamformed link 713 may include a LOS beam, e.g., having the same polarization or different polarizations.

In some demonstrative embodiments, as shown in FIG. 7C, radio 720, e.g., radio 114 and/or radio 155 (FIG. 1), may include one or more components, and/or elements, according to SU MIMO configuration 700.

In some demonstrative embodiments, as shown in FIG. 7C, radio 720 may include PAA 707 and/or PAA 709, two supply chains 719 and/or a digital baseband 715, for example, configured to process, provide, and/or communicate first data stream 721 and the second data stream 723.

Referring back to FIG. 1, in some demonstrative embodiments, devices 102 and/or 140 may be configured to communicate according to the SU MIMO Configuration #4 of Table 1, e.g., as described below.

In some demonstrative embodiments, according to SU MIMO Configuration #4, both devices 102 and 140 may use a dual array with a dual polarization and four spatial streams. For example, both devices 102 and 140 may use MIMO scheme 400 (FIG. 4).

In some demonstrative embodiments, the SU MIMO configuration, e.g., the SU MIMO Configuration #4, may include two PAAs, four data streams, a dual polarization, and a distance between the two PAAs.

For example, antennas 107 and/or 147 may include, and/or may be implemented as, two PAAs, each having a dual polarization, and at a distance d between the two PAAs; and/or RF chains 109 and/or 149 may include four RF chains to communicate the four data streams, e.g., two RF chains per each PAA.

In some demonstrative embodiments, antennas 107 and/or 147 may include a dual array MIMO using a dual PAA each of an M×N rectangular geometry. All PAA elements may have both linear polarization of type H (horizontal) and type V (vertical).

In some demonstrative embodiments, controller 124 may be configured to cause, trigger and/or control device 102 to transmit the SU MIMO transmission by the two PAA of device 102 via four respective directional beams.

In some demonstrative embodiments, a PAA of the two PAAs may be configured to transmit two directional beams.

In some demonstrative embodiments, the two directional beams may have two respective different polarizations.

In some demonstrative embodiments, controller 144 may be configured to cause, trigger and/or control device 140 to receive the SU MIMO transmission by the two PAA of device 140 via the four respective directional beams.

Figure 8C:
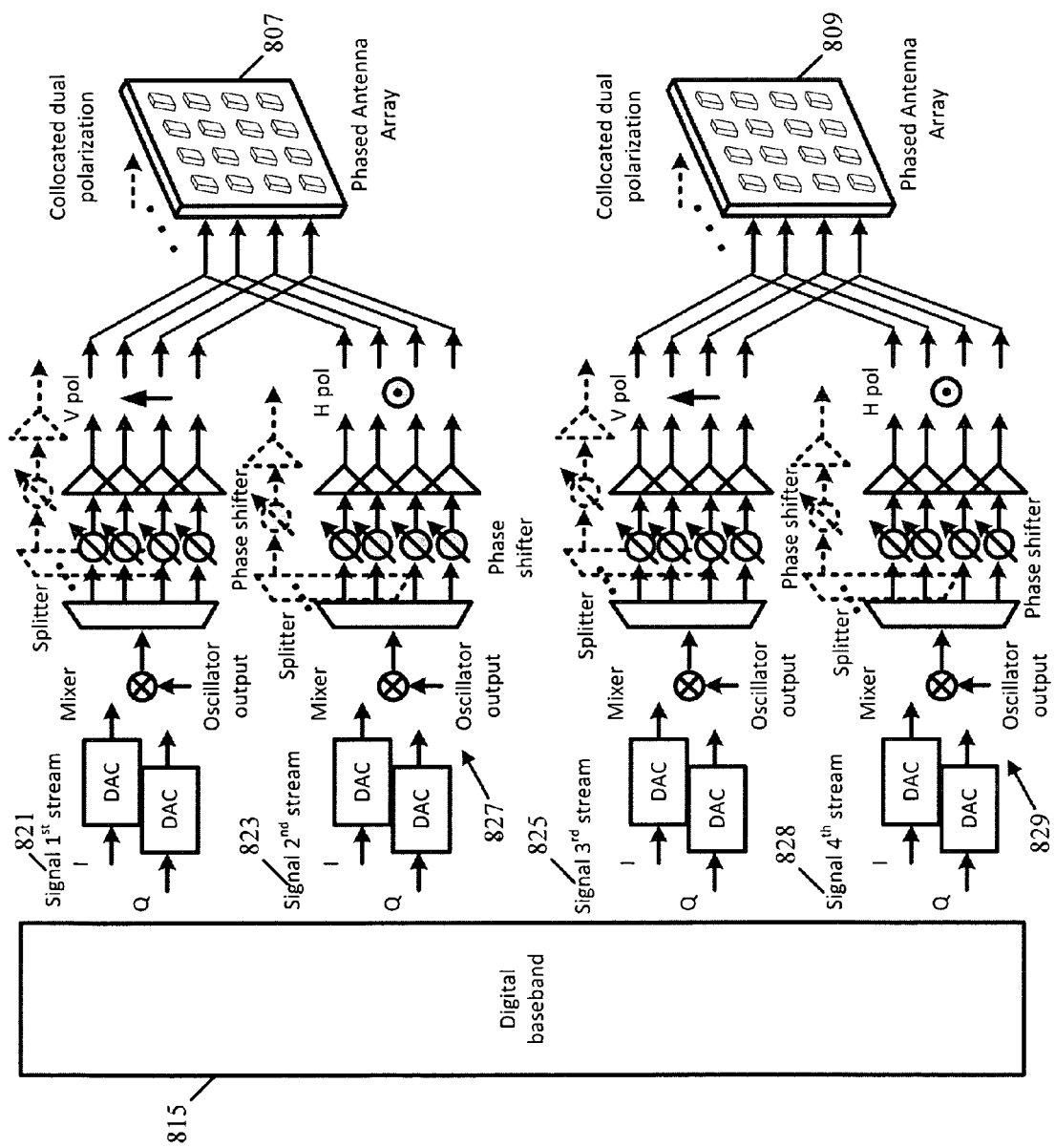
FIG. 8C is a schematic illustration of a radio configured to communicate according to the MIMO configuration of FIG. 8A, in accordance with some demonstrative embodiments.

Reference is made to FIG. 8A, which schematically illustrates an SU MIMO configuration 800, e.g., according to the SU MIMO Configuration #4, FIG. 8B, which schematically illustrates beamformed links 810 according to SU MIMO configuration 800, and FIG. 8C, which schematically illustrates a radio 820 configured to communicate according to SU MIMO configuration 800, in accordance with some demonstrative embodiments.

In some demonstrative embodiments, devices 102 and 140 (FIG. 1) may be configured to communicate according to SU-MIMO configuration 800, e.g., as described below.

In some demonstrative embodiments, as shown in FIG. 8A, SU MIMO configuration 800 may include a first PAA 807 and a second PAA 809, each having a dual polarization, e.g., PAA 407 and/or PAA 409 (FIG. 4).

In one example, antennas 107 and/or 147 (FIG. 1) may include and/or may be implemented as two PAAs, e.g., PAA 807 and PAA 809.

In some demonstrative embodiments, as shown in FIG. 8A, a PAA element 817 of PAA 807 may be connected to and/or associated with two supply chains 827, for example, to communicate a first data stream 821 and a second data stream 823, for example, via a first beamformed link and a second beamformed link, respectively.

In some demonstrative embodiments, as shown in FIG. 8A, a PAA element 819 of PAA 809 may be connected to and/or associated with two supply chains 829, for example, to communicate a third data stream 825 and a fourth data stream 828, for example, via a third beamformed link and a fourth beamformed link, respectively.

In some demonstrative embodiments, as shown in FIG. 8A, PAA 807 and PAA 809 may be separated by a distance d, e.g., between centers of PAA 807 and PAA 809.

In some demonstrative embodiments, as shown in FIG. 8B, a first device ("device 1"), e.g., device 102 (FIG. 1), and a second device ("device 2"), e.g., device 140 (FIG. 1), may communicate the first data stream 821 and the second data stream 823 over a first beamformed link 811 and a second beamformed link 813, respectively.

In some demonstrative embodiments, as shown in FIG. 8B, the first device and the second device may communicate the third data stream 825 and the fourth data stream 828 over a third beamformed link 812 and a forth beamformed link 814, respectively.

In some demonstrative embodiments, as shown in FIG. 8B, first beamformed link 811 and second beamformed link 813 may have different polarization settings.

In some demonstrative embodiments, as shown in FIG. 8B, third beamformed link 812 and a forth beamformed link 814 may have different polarization settings.

In some demonstrative embodiments, SU MIMO configuration 800 may enable to communicate four data streams via four respective directional beams.

In some demonstrative embodiments, as shown in FIG. 8B, beamformed links 811, 812, 813 and 814 may include different combinations of LOS and/or NLOS directional beams, e.g., as described below.

In some demonstrative embodiments, as shown in FIG. 8B, in a first scheme 826 first beamformed link 811 and second beamformed link 813 may include two respective LOS beams, e.g., having different polarizations; and third beamformed link 812 and fourth beamformed link 814 may include two respective LOS beams, e.g., having different polarizations.

In some demonstrative embodiments, as shown in FIG. 8B, in a second scheme 828 first beamformed link 811 and second beamformed link 813 may include two respective NLOS beams, e.g., having different polarizations; and third beamformed link 812 and fourth beamformed link 814 may include two respective NLOS beams, e.g., having different polarizations.

In some demonstrative embodiments, as shown in FIG. 8B, in a third scheme 830 first beamformed link 811 and second beamformed link 813 may include two respective NLOS beams directed to the same direction, e.g., with different polarizations; and third beamformed link 812 and fourth beamformed link 814 may include two respective NLOS beams directed to different directions, e.g., with different polarizations.

In some demonstrative embodiments, as shown in FIG. 8B, in a fourth scheme 832 first beamformed link 811 and second beamformed link 813 may include two respective NLOS beams directed to the same direction, e.g., with different polarizations; and third beamformed link 812 and fourth beamformed link 814 may include two respective LOS beams, e.g., with different polarizations.

In some demonstrative embodiments, as shown in FIG. 8C, radio 820, e.g., radio 114 and/or radio 155 (FIG. 1), may include one or more components, and/or elements, according to SU MIMO configuration 800.

In some demonstrative embodiments, as shown in FIG. 8C, radio 820 may include a digital baseband 815, PAA 807 connected to and/or associated with two supply chains 827, for example, configured to process, provide, and/or communicate first data stream 821 and the second data stream 823, and/or PAA 809 connected to and/or associated with two supply chains 829, for example, configured to process, provide, and/or communicate third data stream 825 and the fourth data stream 828.

Referring back to FIG. 1, in some demonstrative embodiments, devices 102 and/or 140 may be configured to communicate according to the SU-SU MIMO Configuration #5 of Table 1.

In some demonstrative embodiments, according to SU MIMO Configuration #5, a single array with a single polarization and one data stream may be used at a first device, e.g., device 102, and a single array with a dual polarization and two data streams may be used at the second device, e.g., device 140.

In some demonstrative embodiments, the SU MIMO configuration at device 102, e.g., according to the SU MIMO Configuration #5, may include a single PAA, a single data stream and a single polarization.

For example, antennas 107 may include, and/or may be implemented as, a single PAA having a single polarization, and/or RF chains 109 may include one RF chain to communicate one data stream.

In some demonstrative embodiments, the SU MIMO configuration at device 140, e.g., according to the SU MIMO Configuration #5, may include a single PAA, a single data stream, two Radio Frequency (RF) chains, and a dual polarization. For example, device 140 may use MIMO scheme 300 (FIG. 3).

For example, antennas 147 may include, and/or may be implemented as, a single PAA having a dual polarization, and/or RF chains 149 may include two RF chain to process two data streams.

In some demonstrative embodiments, antennas 107 and/or 147 may include a single array MIMO using a single PAA of an M×N rectangular geometry, e.g., a size of 4×4.

In some demonstrative embodiments, controller 124 may be configured to cause, trigger and/or control device 102 to transmit the SU MIMO transmission by the single PAA of device 102 via a single directional beam.

In some demonstrative embodiments, controller 144 may be configured to cause, trigger and/or control device 140 to receive the SU MIMO transmission by the single PAA of device 140 via the single directional beam.

In some demonstrative embodiments, controller 144 may be configured to cause, trigger and/or control device 140 to process the data stream by the two RF chains.

In one example, the first device may transmit only one data stream over one directional beam. However, the second device may process two data streams, which may be supplied with the same signal. Accordingly, the second device may actually have only 1 data stream, but two supply RF chains.

Figure 9C:
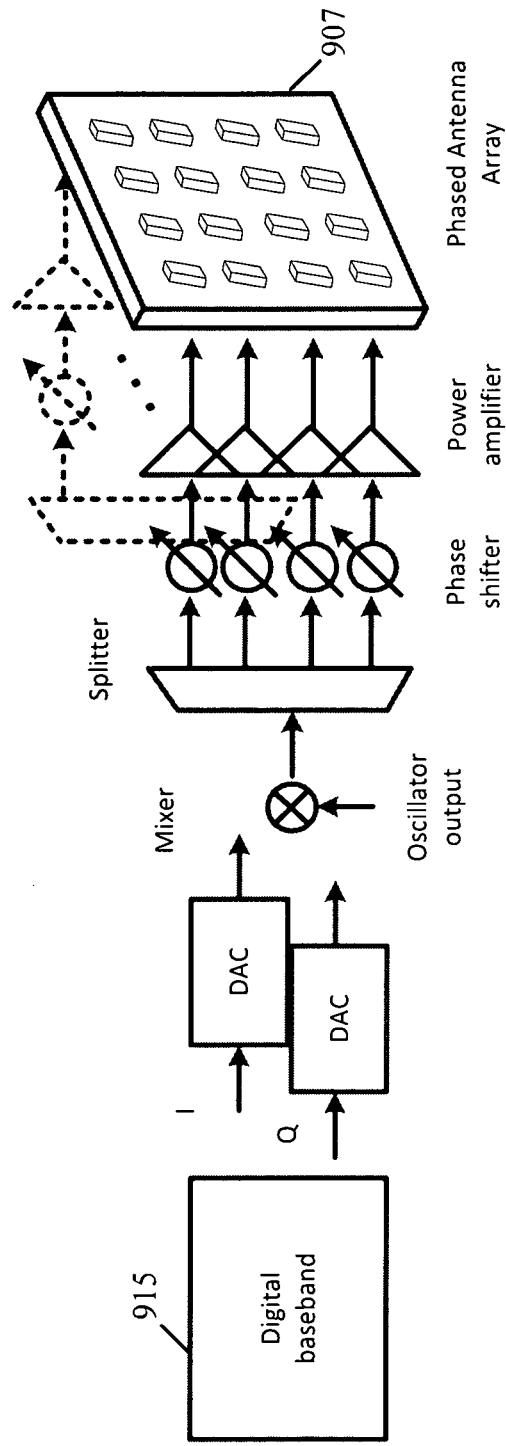
FIG. 9C is a schematic illustration of a radio configured to communicate according to the MIMO configuration of FIG. 9A, in accordance with some demonstrative embodiments.

Reference is made to FIG. 9A, which schematically illustrates an SU MIMO configuration 900 at a first device, e.g., according to the SU MIMO Configuration #5, FIG. 9B, which schematically illustrates an SU MIMO configuration 910 at a second device e.g., according to the SU MIMO Configuration #5, and FIG. 9C, which schematically illustrates a radio 920 of the first device configured to communicate according to SU MIMO configuration 900, in accordance with some demonstrative embodiments.

In some demonstrative embodiments, devices 102 and 140 (FIG. 1) may be configured to communicate according to SU-MIMO configuration 900, e.g., as described below.

In some demonstrative embodiments, as shown in FIG. 9A, SU MIMO configuration 900 may include, e.g., at the first device, a single PAA 907 having a single polarization, e.g., PAA 307 (FIG. 3).

In one example, antennas 107 (FIG. 1) may include and/or may be implemented as PAA 907.

In some demonstrative embodiments, as shown in FIG. 9A, a PAA element 917 of PAA 907 may be connected to and/or associated with a single supply chain 927, for example, to communicate a single data stream 921, for example, via a single beamformed link.

In some demonstrative embodiments, as shown in FIG. 9B, SU MIMO configuration 910 may include, e.g., at the second device, a single PAA 909 having a dual polarization, e.g., PAA 407 (FIG. 4).

In one example, antennas 147 (FIG. 1) may include and/or may be implemented as PAA 909.

In some demonstrative embodiments, as shown in FIG. 9B, a PAA element 919 of PAA 909 may be connected to and/or associated with two supply chains 929, for example, to communicate two data streams 925, for example, via the single beamformed link.

In some demonstrative embodiments, two data streams 925 may be supplied with the same single data stream 921.

In some demonstrative embodiments, the SU MIMO configuration #5 may enable, for example, communicating a single data stream for two devices having different PAA configurations.

In some demonstrative embodiments, as shown in FIG. 9C, radio 920, e.g., radio 114 (FIG. 1), may include one or more components, and/or elements, according to SU MIMO configuration 900 at the first device.

In some demonstrative embodiments, as shown in FIG. 9C, radio 920 may include single PAA 907, single supply chain 927 and/or a digital baseband 915, for example, configured to process, provide, and/or communicate single data stream 921.

Referring back to FIG. 1, in some demonstrative embodiments, the SU MIMO configuration may be predefined, for example, based on configuration, functionality, and/or setting of devices 102 and/or 140.

In some demonstrative embodiments, devices 102 and/or 140 may be configured to signal the SU MIMO configuration.

In one example, a device, e.g., device 102, may be configured to signal the SU MIMO configuration to be used by the device, for example, to another device, e.g., device 140.

In some demonstrative embodiments, controller 124 may be configured to cause, trigger and/or control device 102 to transmit a message to device 140, e.g., prior to communicating the SU MIMO transmission.

In some demonstrative embodiments, the message may include a first indication of the number of data streams, a second indication of the number of PAAs, and a third indication of the polarization type. For example, the message may include an indication of two data streams, two PAAs and single polarization, for example, if the SU MIMO configuration includes the SU MIMO configuration #3 of Table 1.

In some demonstrative embodiments, the message may include a configuration type indicator to indicate the predefined SU MIMO configuration. For example, the message may include a predefined value, e.g., the number 3, for example, if the SU MIMO configuration includes the SU MIMO configuration #3 of Table 1.

In some demonstrative embodiments, device 140 may receive the message from device 102.

In some demonstrative embodiments, controller 154 may be configured to cause, trigger and/or control device 140 to receive the message from device 140, e.g., prior to communicating the SU MIMO transmission.

In some demonstrative embodiments, controller 154 may be configured to cause, trigger and/or control device 140 to configure antennas 147, for example, based on the SU MIMO configuration indicated by the message.

Figure 10:
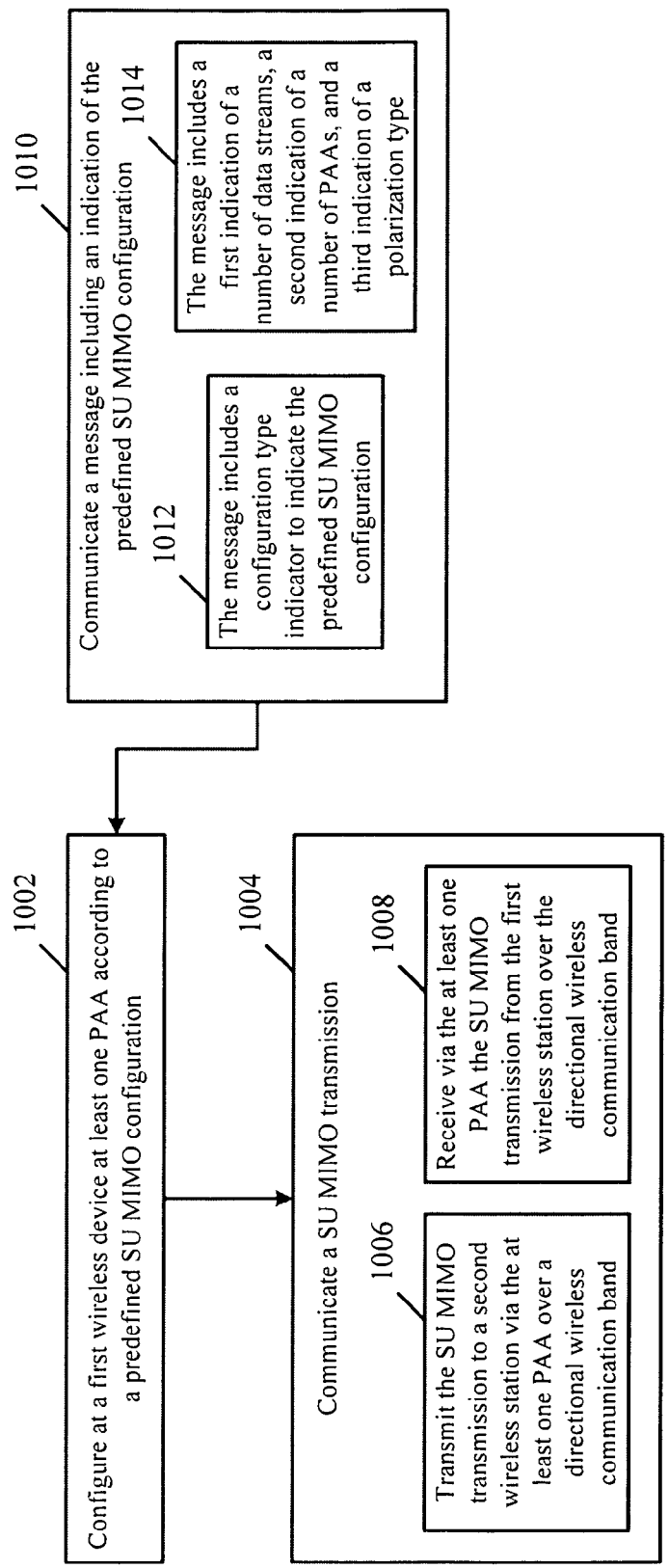
FIG. 10 is a schematic flow-chart illustration of a method of Single-User (Su) Multi-In-Multi-Out (MIMO) communication, in accordance with some demonstrative embodiments.

Reference is made to FIG. 10, which schematically illustrates a method of SU MIMO communication, in accordance with some demonstrative embodiments. For example, one or more of the operations of the method of FIG. 10 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1002, the method may include configuring at least one PAA according to a predefined SU MIMO configuration, the SU MIMO configuration including at least a number of data streams, a number of PAAs to be used, and a polarization type to be applied. For example, device 102 (FIG. 1) may configure at least one PAA of directional antennas 107 (FIG. 1), for example, according to a predefined SU MIMO configuration of Table 1; and/or device 140 (FIG. 1) may configure at least one PAA of directional antennas 147 (FIG. 1), for example, according to the predefined SU MIMO configuration of Table 1, e.g., as described above.

As indicated at block 1004, the method may include communicating a SU MIMO transmission between a first and second wireless stations via the at least one PAA over a directional wireless communication band.

As indicated at block 1006, communicating the SU MIMO transmission may include transmitting the SU MIMO transmission to the second wireless station via the at least one PAA over the directional wireless communication band. For example, device 102 (FIG. 1) may transmit the SU MIMO transmission to device 140 (FIG. 1) via the at least one PAA of directional antennas 107 (FIG. 1) over the directional wireless communication band, e.g., as described above.

As indicated at block 1008, communicating the SU MIMO transmission may include receiving the SU MIMO transmission from the first wireless stations via the at least one PAA over the directional wireless communication band. For example, device 140 (FIG. 1) may receive the SU MIMO transmission from device 102 (FIG. 1) via the at least one PAA of directional antennas 147 (FIG. 1) over the directional wireless communication band, e.g., as described above.

As indicated at block 1010, the method may include communicating a message between the first and second wireless stations prior to the SU MIMO transmission, the message including an indication of the predefined SU MIMO configuration. For example, device 102 (FIG. 1) may transmit the message including the indication of the predefined SU MIMO configuration; and/or device 140 (FIG. 1) may receive the message including the indication of the predefined SU MIMO configuration, e.g., as described above.

As indicated at block 1012, communicating the message between the first and second wireless stations may include communicating the message including a configuration type indicator to indicate the predefined SU MIMO configuration. For example, device 102 (FIG. 1) may transmit the message including the configuration type indicator to indicate the predefined SU MIMO configuration; and/or device 140 (FIG. 1) may receive the message including the configuration type indicator to indicate the predefined SU MIMO configuration, e.g., as described above.

As indicated at block 1014, communicating the message between the first and second wireless stations may include communicating the message including a first indication of the number of data streams, a second indication of the number of PAAs, and a third indication of the polarization type. For example, device 102 (FIG. 1) may transmit the message including the first indication of the number of data streams, the second indication of the number of PAAs, and the third indication of the polarization type; and/or device 140 (FIG. 1) may receive the message including the first indication of the number of data streams, the second indication of the number of PAAs, and the third indication of the polarization type, e.g., as described above.

Figure 11:
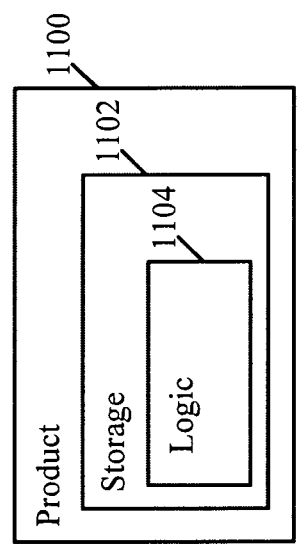
FIG. 11 is a schematic illustration of a product of manufacture, in accordance with some demonstrative embodiments.

Reference is made to FIG. 11, which schematically illustrates a product of manufacture 1100, in accordance with some demonstrative embodiments. Product 1100 may include one or more tangible computer-readable non-transitory storage media 1102, which may include computer-executable instructions, e.g., implemented by logic 1104, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform, trigger and/or implement one or more operations and/or functionalities, for example, one or more operations of the method of FIG. 10, and/or one or more operations and/or functionalities described above with reference to any one of FIGS. 1-9. The phrase "non-transitory machine-readable medium" is directed to include all computer-readable media, with the sole exception being a transitory propagating signal.

In some demonstrative embodiments, product 1100 and/or machine-readable storage medium 1102 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising logic and circuitry configured to cause a first wireless station to configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and transmit a SU MIMO transmission to a second wireless station via the at least one PAA over a directional wireless communication band.

Example 2 includes the subject matter of Example 1, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 3 includes the subject matter of Example 1 or 2, and optionally, wherein the SU MIMO configuration comprises at least a number of Radio-Frequency (RF) chains per PAA.

Example 4 includes the subject matter of any one of Examples 1-3, and optionally, wherein the number of data streams comprises one stream, two streams, or four streams.

Example 5 includes the subject matter of any one of Examples 1-4, and optionally, wherein the at least one PAA comprises one PAA or two PAAs.

Example 6 includes the subject matter of any one of Examples 1-5, and optionally, wherein the polarization type comprises a single polarization or a dual polarization.

Example 7 includes the subject matter of Example 1, and optionally, wherein the at least one PAA comprises a single PAA having a single polarization or a dual polarization.

Example 8 includes the subject matter of Example 1, and optionally, wherein the at least one PAA comprises two PAAs, a PAA of the two PAAs having a dual polarization or a single polarization.

Example 9 includes the subject matter of Example 1, and optionally, wherein the SU MIMO configuration comprises a single PAA, two data streams, and a single polarization.

Example 10 includes the subject matter of Example 9, and optionally, wherein the apparatus is configured to cause the first wireless station to transmit the SU MIMO transmission by the single PAA via two respective directional beams having a same polarization.

Example 11 includes the subject matter of Example 10, and optionally, wherein the two directional beams comprise two Non Line of Sight (NLOS) beams.

Example 12 includes the subject matter of Example 1, and optionally, wherein the SU MIMO configuration comprises a single PAA, two data streams, and a dual polarization.

Example 13 includes the subject matter of Example 12, and optionally, wherein the apparatus is configured to cause the first wireless station to transmit the SU MIMO transmission by the single PAA via two respective directional beams, the two directional beams having two respective different polarizations.

Example 14 includes the subject matter of Example 13, and optionally, wherein the two directional beams comprise two Line of Sight (LOS) beams.

Example 15 includes the subject matter of Example 1, and optionally, wherein the SU MIMO configuration comprises two PAAs, two data streams, a single polarization, and a distance between the two PAAs.

Example 16 includes the subject matter of Example 15, and optionally, wherein the apparatus is configured to cause the first wireless station to transmit the SU MIMO transmission by the two PAAs via two respective directional beams having a same polarization.

Example 17 includes the subject matter of Example 1, and optionally, wherein the SU MIMO configuration comprises two PAAs, four data streams, a dual polarization, and a distance between the two PAAs.

Example 18 includes the subject matter of Example 17, and optionally, wherein the apparatus is configured to cause the first wireless station to transmit the SU MIMO transmission by the two PAAs via four directional beams, a PAA of the two PAAs to transmit two directional beams, the two directional beams having two respective different polarizations.

Example 19 includes the subject matter of Example 1, and optionally, wherein the SU MIMO configuration comprises a single PAA, a single data stream, and a single polarization.

Example 20 includes the subject matter of Example 19, and optionally, wherein the apparatus is configured to cause the first wireless station to transmit the SU MIMO transmission by the single PAA via a single directional beam.

Example 21 includes the subject matter of any one of Examples 1-20, and optionally, wherein the apparatus is configured to cause the first wireless station to transmit a message to the second wireless station prior to the SU MIMO transmission, the message comprising a first indication of the number of data streams, a second indication of the number of PAAs, and a third indication of the polarization type.

Example 22 includes the subject matter of any one of Examples 1-20, and optionally, wherein the apparatus is configured to cause the first wireless station to transmit a message to the second wireless station prior to the SU MIMO transmission, the message comprising a configuration type indicator to indicate the predefined SU MIMO configuration.

Example 23 includes the subject matter of any one of Examples 1-22, and optionally, wherein the directional wireless communication band is a Directional Multi-Gigabit (DMG) band.

Example 24 includes the subject matter of any one of Examples 1-23, and optionally, wherein the first wireless station is a Directional Multi-Gigabit (DMG) Station (STA).

Example 25 includes the subject matter of any one of Examples 1-24, and optionally, comprising the at least one PAA, a memory, and a processor.

Example 26 includes a system of wireless communication comprising a first wireless station, the first wireless station comprising a memory; a processor; and a controller configured to cause the first wireless station to configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and transmit a SU MIMO transmission to a second wireless station via the at least one PAA over a directional wireless communication band.

Example 27 includes the subject matter of Example 26, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 28 includes the subject matter of Example 26 or 27, and optionally, wherein the SU MIMO configuration comprises at least a number of Radio-Frequency (RF) chains per PAA.

Example 29 includes the subject matter of any one of Examples 26-28, and optionally, wherein the number of data streams comprises one stream, two streams, or four streams.

Example 30 includes the subject matter of any one of Examples 26-29, and optionally, wherein the at least one PAA comprises one PAA or two PAAs.

Example 31 includes the subject matter of any one of Examples 26-30, and optionally, wherein the polarization type comprises a single polarization or a dual polarization.

Example 32 includes the subject matter of Example 26, and optionally, wherein the at least one PAA comprises a single PAA having a single polarization or a dual polarization.

Example 33 includes the subject matter of Example 26, and optionally, wherein the at least one PAA comprises two PAAs, a PAA of the two PAAs having a dual polarization or a single polarization.

Example 34 includes the subject matter of Example 26, and optionally, wherein the SU MIMO configuration comprises a single PAA, two data streams, and a single polarization.

Example 35 includes the subject matter of Example 34, and optionally, wherein the controller is configured to cause the first wireless station to transmit the SU MIMO transmission by the single PAA via two respective directional beams having a same polarization.

Example 36 includes the subject matter of Example 35, and optionally, wherein the two directional beams comprise two Non Line of Sight (NLOS) beams.

Example 37 includes the subject matter of Example 26, and optionally, wherein the SU MIMO configuration comprises a single PAA, two data streams, and a dual polarization.

Example 38 includes the subject matter of Example 37, and optionally, wherein the controller is configured to cause the first wireless station to transmit the SU MIMO transmission by the single PAA via two respective directional beams, the two directional beams having two respective different polarizations.

Example 39 includes the subject matter of Example 38, and optionally, wherein the two directional beams comprise two Line of Sight (LOS) beams.

Example 40 includes the subject matter of Example 26, and optionally, wherein the SU MIMO configuration comprises two PAAs, two data streams, a single polarization, and a distance between the two PAAs.

Example 41 includes the subject matter of Example 40, and optionally, wherein the controller is configured to cause the first wireless station to transmit the SU MIMO transmission by the two PAAs via two respective directional beams having a same polarization.

Example 42 includes the subject matter of Example 26, and optionally, wherein the SU MIMO configuration comprises two PAAs, four data streams, a dual polarization, and a distance between the two PAAs.

Example 43 includes the subject matter of Example 42, and optionally, wherein the controller is configured to cause the first wireless station to transmit the SU MIMO transmission by the two PAAs via four directional beams, a PAA of the two PAAs to transmit two directional beams, the two directional beams having two respective different polarizations.

Example 44 includes the subject matter of Example 26, and optionally, wherein the SU MIMO configuration comprises a single PAA, a single data stream, and a single polarization.

Example 45 includes the subject matter of Example 44, and optionally, wherein the controller is configured to cause the first wireless station to transmit the SU MIMO transmission by the single PAA via a single directional beam.

Example 46 includes the subject matter of any one of Examples 26-45, and optionally, wherein the controller is configured to cause the first wireless station to transmit a message to the second wireless station prior to the SU MIMO transmission, the message comprising a first indication of the number of data streams, a second indication of the number of PAAs, and a third indication of the polarization type.

Example 47 includes the subject matter of any one of Examples 26-45, and optionally, wherein the controller is configured to cause the first wireless station to transmit a message to the second wireless station prior to the SU MIMO transmission, the message comprising a configuration type indicator to indicate the predefined SU MIMO configuration.

Example 48 includes the subject matter of any one of Examples 26-47, and optionally, wherein the directional wireless communication band is a Directional Multi-Gigabit (DMG) band.

Example 49 includes the subject matter of any one of Examples 26-48, and optionally, wherein the first wireless station is a Directional Multi-Gigabit (DMG) Station (STA).

Example 50 includes the subject matter of any one of Examples 26-49, and optionally, wherein the first wireless station comprises the at least one PAA.

Example 51 includes a method to be performed at a first wireless station, the method comprising configuring at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and transmitting a SU MIMO transmission to a second wireless station via the at least one PAA over a directional wireless communication band.

Example 52 includes the subject matter of Example 51, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 53 includes the subject matter of Example 51 or 52, and optionally, wherein the SU MIMO configuration comprises at least a number of Radio-Frequency (RF) chains per PAA.

Example 54 includes the subject matter of any one of Examples 51-53, and optionally, wherein the number of data streams comprises one stream, two streams, or four streams.

Example 55 includes the subject matter of any one of Examples 51-54, and optionally, wherein the at least one PAA comprises one PAA or two PAAs.

Example 56 includes the subject matter of any one of Examples 51-55, and optionally, wherein the polarization type comprises a single polarization or a dual polarization.

Example 57 includes the subject matter of Example 51, and optionally, wherein the at least one PAA comprises a single PAA having a single polarization or a dual polarization.

Example 58 includes the subject matter of Example 51, and optionally, wherein the at least one PAA comprises two PAAs, a PAA of the two PAAs having a dual polarization or a single polarization.

Example 59 includes the subject matter of Example 51, and optionally, wherein the SU MIMO configuration comprises a single PAA, two data streams, and a single polarization.

Example 60 includes the subject matter of Example 59, and optionally, comprising transmitting the SU MIMO transmission by the single PAA via two respective directional beams having a same polarization.

Example 61 includes the subject matter of Example 60, and optionally, wherein the two directional beams comprise two Non Line of Sight (NLOS) beams.

Example 62 includes the subject matter of Example 51, and optionally, wherein the SU MIMO configuration comprises a single PAA, two data streams, and a dual polarization.

Example 63 includes the subject matter of Example 62, and optionally, comprising transmitting the SU MIMO transmission by the single PAA via two respective directional beams, the two directional beams having two respective different polarizations.

Example 64 includes the subject matter of Example 63, and optionally, wherein the two directional beams comprise two Line of Sight (LOS) beams.

Example 65 includes the subject matter of Example 51, and optionally, wherein the SU MIMO configuration comprises two PAAs, two data streams, a single polarization, and a distance between the two PAAs.

Example 66 includes the subject matter of Example 65, and optionally, comprising transmitting the SU MIMO transmission by the two PAAs via two respective directional beams having a same polarization.

Example 67 includes the subject matter of Example 51, and optionally, wherein the SU MIMO configuration comprises two PAAs, four data streams, a dual polarization, and a distance between the two PAAs.

Example 68 includes the subject matter of Example 67, and optionally, comprising transmitting the SU MIMO transmission by the two PAAs via four directional beams, transmitting the SU MIMO transmission comprises transmitting two directional beams via a PAA of the two PAAs to transmit, the two directional beams having two respective different polarizations.

Example 69 includes the subject matter of Example 51, and optionally, wherein the SU MIMO configuration comprises a single PAA, a single data stream, and a single polarization.

Example 70 includes the subject matter of Example 69, and optionally, comprising transmitting the SU MIMO transmission by the single PAA via a single directional beam.

Example 71 includes the subject matter of any one of Examples 51-70, and optionally, comprising transmitting a message to the second wireless station prior to the SU MIMO transmission, the message comprising a first indication of the number of data streams, a second indication of the number of PAAs, and a third indication of the polarization type.

Example 72 includes the subject matter of any one of Examples 51-70, and optionally, comprising transmitting a message to the second wireless station prior to the SU MIMO transmission, the message comprising a configuration type indicator to indicate the predefined SU MIMO configuration.

Example 73 includes the subject matter of any one of Examples 51-72, and optionally, wherein the directional wireless communication band is a Directional Multi-Gigabit (DMG) band.

Example 74 includes the subject matter of any one of Examples 51-73, and optionally, wherein the first wireless station is a Directional Multi-Gigabit (DMG) Station (STA).

Example 75 includes a product comprising one or more tangible computer-readable non-transitory storage media comprising computer-executable instructions operable to, when executed by at least one computer processor, enable the at least one computer processor to implement one or more operations at a first wireless station, the operations comprising configuring at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and transmitting a SU MIMO transmission to a second wireless station via the at least one PAA over a directional wireless communication band.

Example 76 includes the subject matter of Example 75, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 77 includes the subject matter of Example 75 or 76, and optionally, wherein the SU MIMO configuration comprises at least a number of Radio-Frequency (RF) chains per PAA.

Example 78 includes the subject matter of any one of Examples 75-77, and optionally, wherein the number of data streams comprises one stream, two streams, or four streams.

Example 79 includes the subject matter of any one of Examples 75-78, and optionally, wherein the at least one PAA comprises one PAA or two PAAs.

Example 80 includes the subject matter of any one of Examples 75-79, and optionally, wherein the polarization type comprises a single polarization or a dual polarization.

Example 81 includes the subject matter of Example 75, and optionally, wherein the at least one PAA comprises a single PAA having a single polarization or a dual polarization.

Example 82 includes the subject matter of Example 75, and optionally, wherein the at least one PAA comprises two PAAs, a PAA of the two PAAs having a dual polarization or a single polarization.

Example 83 includes the subject matter of Example 75, and optionally, wherein the SU MIMO configuration comprises a single PAA, two data streams, and a single polarization.

Example 84 includes the subject matter of Example 83, and optionally, wherein the operations comprise transmitting the SU MIMO transmission by the single PAA via two respective directional beams having a same polarization.

Example 85 includes the subject matter of Example 84, and optionally, wherein the two directional beams comprise two Non Line of Sight (NLOS) beams.

Example 86 includes the subject matter of Example 75, and optionally, wherein the SU MIMO configuration comprises a single PAA, two data streams, and a dual polarization.

Example 87 includes the subject matter of Example 86, and optionally, wherein the operations comprise transmitting the SU MIMO transmission by the single PAA via two respective directional beams, the two directional beams having two respective different polarizations.

Example 88 includes the subject matter of Example 87, and optionally, wherein the two directional beams comprise two Line of Sight (LOS) beams.

Example 89 includes the subject matter of Example 75, and optionally, wherein the SU MIMO configuration comprises two PAAs, two data streams, a single polarization, and a distance between the two PAAs.

Example 90 includes the subject matter of Example 89, and optionally, wherein the operations comprise transmitting the SU MIMO transmission by the two PAAs via two respective directional beams having a same polarization.

Example 91 includes the subject matter of Example 75, and optionally, wherein the SU MIMO configuration comprises two PAAs, four data streams, a dual polarization, and a distance between the two PAAs.

Example 92 includes the subject matter of Example 91, and optionally, wherein the operations comprise transmitting the SU MIMO transmission by the two PAAs via four directional beams, transmitting the SU MIMO transmission comprises transmitting two directional beams via a PAA of the two PAAs, the two directional beams having two respective different polarizations.

Example 93 includes the subject matter of Example 75, and optionally, wherein the SU MIMO configuration comprises a single PAA, a single data stream, and a single polarization.

Example 94 includes the subject matter of Example 93, and optionally, wherein the operations comprise transmitting the SU MIMO transmission by the single PAA via a single directional beam.

Example 95 includes the subject matter of any one of Examples 75-94, and optionally, wherein the operations comprise transmitting a message to the second wireless station prior to the SU MIMO transmission, the message comprising a first indication of the number of data streams, a second indication of the number of PAAs, and a third indication of the polarization type.

Example 96 includes the subject matter of any one of Examples 75-94, and optionally, wherein the operations comprise transmitting a message to the second wireless station prior to the SU MIMO transmission, the message comprising a configuration type indicator to indicate the predefined SU MIMO configuration.

Example 97 includes the subject matter of any one of Examples 75-96, and optionally, wherein the directional wireless communication band is a Directional Multi-Gigabit (DMG) band.

Example 98 includes the subject matter of any one of Examples 75-97, and optionally, wherein the first wireless station is a Directional Multi-Gigabit (DMG) Station (STA).

Example 99 includes an apparatus of a first wireless station comprising means for configuring at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and means for transmitting a SU MIMO transmission to a second wireless station via the at least one PAA over a directional wireless communication band.

Example 100 includes the subject matter of Example 99, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 101 includes the subject matter of Example 99 or 100, and optionally, wherein the SU MIMO configuration comprises at least a number of Radio-Frequency (RF) chains per PAA.

Example 102 includes the subject matter of any one of Examples 99-101, and optionally, wherein the number of data streams comprises one stream, two streams, or four streams.

Example 103 includes the subject matter of any one of Examples 99-102, and optionally, wherein the at least one PAA comprises one PAA or two PAAs.

Example 104 includes the subject matter of any one of Examples 99-103, and optionally, wherein the polarization type comprises a single polarization or a dual polarization.

Example 105 includes the subject matter of Example 99, and optionally, wherein the at least one PAA comprises a single PAA having a single polarization or a dual polarization.

Example 106 includes the subject matter of Example 99, and optionally, wherein the at least one PAA comprises two PAAs, a PAA of the two PAAs having a dual polarization or a single polarization.

Example 107 includes the subject matter of Example 99, and optionally, wherein the SU MIMO configuration comprises a single PAA, two data streams, and a single polarization.

Example 108 includes the subject matter of Example 107, and optionally, comprising means for transmitting the SU MIMO transmission by the single PAA via two respective directional beams having a same polarization.

Example 109 includes the subject matter of Example 108, and optionally, wherein the two directional beams comprise two Non Line of Sight (NLOS) beams.

Example 110 includes the subject matter of Example 99, and optionally, wherein the SU MIMO configuration comprises a single PAA, two data streams, and a dual polarization.

Example 111 includes the subject matter of Example 110, and optionally, comprising means for transmitting the SU MIMO transmission by the single PAA via two respective directional beams, the two directional beams having two respective different polarizations.

Example 112 includes the subject matter of Example 111, and optionally, wherein the two directional beams comprise two Line of Sight (LOS) beams.

Example 113 includes the subject matter of Example 99, and optionally, wherein the SU MIMO configuration comprises two PAAs, two data streams, a single polarization, and a distance between the two PAAs.

Example 114 includes the subject matter of Example 113, and optionally, comprising means for transmitting the SU MIMO transmission by the two PAAs via two respective directional beams having a same polarization.

Example 115 includes the subject matter of Example 99, and optionally, wherein the SU MIMO configuration comprises two PAAs, four data streams, a dual polarization, and a distance between the two PAAs.

Example 116 includes the subject matter of Example 115, and optionally, comprising means for transmitting the SU MIMO transmission by the two PAAs via four directional beams, transmitting the SU MIMO transmission comprises transmitting two directional beams via a PAA of the two PAAs, the two directional beams having two respective different polarizations.

Example 117 includes the subject matter of Example 99, and optionally, wherein the SU MIMO configuration comprises a single PAA, a single data stream, and a single polarization.

Example 118 includes the subject matter of Example 117, and optionally, comprising means for transmitting the SU MIMO transmission by the single PAA via a single directional beam.

Example 119 includes the subject matter of any one of Examples 99-118, and optionally, comprising means for transmitting a message to the second wireless station prior to the SU MIMO transmission, the message comprising a first indication of the number of data streams, a second indication of the number of PAAs, and a third indication of the polarization type.

Example 120 includes the subject matter of any one of Examples 99-118, and optionally, comprising means for transmitting a message to the second wireless station prior to the SU MIMO transmission, the message comprising a configuration type indicator to indicate the predefined SU MIMO configuration.

Example 121 includes the subject matter of any one of Examples 99-120, and optionally, wherein the directional wireless communication band is a Directional Multi-Gigabit (DMG) band.

Example 122 includes the subject matter of any one of Examples 99-121, and optionally, wherein the first wireless station is a Directional Multi-Gigabit (DMG) Station (STA).

Example 123 includes an apparatus comprising logic and circuitry configured to cause a first wireless station to configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and receive via the at least one PAA a SU MIMO transmission from a second wireless station over a directional wireless communication band.

Example 124 includes the subject matter of Example 123, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 125 includes the subject matter of Example 123 or 124, and optionally, wherein the SU MIMO configuration comprises at least a number of Radio-Frequency (RF) chains per PAA.

Example 126 includes the subject matter of any one of Examples 123-125, and optionally, wherein the number of data streams comprises one stream, two streams, or four streams.

Example 127 includes the subject matter of any one of Examples 123-126, and optionally, wherein the at least one PAA comprises one PAA or two PAAs.

Example 128 includes the subject matter of any one of Examples 123-127, and optionally, wherein the polarization type comprises a single polarization or a dual polarization.

Example 129 includes the subject matter of Example 123, and optionally, wherein the at least one PAA comprises a single PAA having a single polarization or a dual polarization.

Example 130 includes the subject matter of Example 123, and optionally, wherein the at least one PAA comprises two PAAs, a PAA of the two PAAs having a dual polarization or a single polarization.

Example 131 includes the subject matter of Example 123, and optionally, wherein the SU MIMO configuration comprises a single PAA, two data streams, and a single polarization.

Example 132 includes the subject matter of Example 131, and optionally, wherein the apparatus is configured to cause the first wireless station to receive the SU MIMO transmission by the single PAA via two respective directional beams having a same polarization.

Example 133 includes the subject matter of Example 132, and optionally, wherein the two directional beams comprise two Non Line of Sight (NLOS) beams.

Example 134 includes the subject matter of Example 123, and optionally, wherein the SU MIMO configuration comprises a single PAA, two data streams, and a dual polarization.

Example 135 includes the subject matter of Example 134, and optionally, wherein the apparatus is configured to cause the first wireless station to receive the SU MIMO transmission by the single PAA via two respective directional beams, the two directional beams having two respective different polarizations.

Example 136 includes the subject matter of Example 135, and optionally, wherein the two directional beams comprise two Line of Sight (LOS) beams.

Example 137 includes the subject matter of Example 123, and optionally, wherein the SU MIMO configuration comprises two PAAs, two data streams, a single polarization, and a distance between the two PAAs.

Example 138 includes the subject matter of Example 137, and optionally, wherein the apparatus is configured to cause the first wireless station to receive the SU MIMO transmission by the two PAAs via two respective directional beams having a same polarization.

Example 139 includes the subject matter of Example 123, and optionally, wherein the SU MIMO configuration comprises two PAAs, four data streams, a dual polarization, and a distance between the two PAAs.

Example 140 includes the subject matter of Example 139, and optionally, wherein the apparatus is configured to cause the first wireless station to receive the SU MIMO transmission by the two PAAs via four directional beams, a PAA of the two PAAs to receive two directional beams, the two directional beams having two respective different polarizations.

Example 141 includes the subject matter of Example 123, and optionally, wherein the SU MIMO configuration comprises a single PAA, a single data stream, two Radio Frequency (RF) chains, and a single polarization.

Example 142 includes the subject matter of Example 141, and optionally, wherein the apparatus is configured to cause the first wireless station to receive the SU MIMO transmission by the single PAA via a single directional beam, and to process the data stream by the two RF chains.

Example 143 includes the subject matter of any one of Examples 123-142, and optionally, wherein the apparatus is configured to cause the first wireless station to receive a message from the second wireless station prior to the SU MIMO transmission, the message comprising a first indication of the number of data streams, a second indication of the number of PAAs, and a third indication of the polarization type.

Example 144 includes the subject matter of any one of Examples 123-142, and optionally, wherein the apparatus is configured to cause the first wireless station to receive a message from the second wireless station prior to the SU MIMO transmission, the message comprising a configuration type indicator to indicate the predefined SU MIMO configuration.

Example 145 includes the subject matter of any one of Examples 123-144, and optionally, wherein the directional wireless communication band is a Directional Multi-Gigabit (DMG) band.

Example 146 includes the subject matter of any one of Examples 123-145, and optionally, wherein the first wireless station is a Directional Multi-Gigabit (DMG) Station (STA).

Example 147 includes the subject matter of any one of Examples 123-146, and optionally, comprising the at least one PAA, a memory, and a processor.

Example 148 includes a system of wireless communication comprising a first wireless station, the first wireless station comprising a memory; a processor; and a controller configured to cause the first wireless station to configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and receive via the at least one PAA a SU MIMO transmission from a second wireless station over a directional wireless communication band.

Example 149 includes the subject matter of Example 148, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 150 includes the subject matter of Example 148 or 149, and optionally, wherein the SU MIMO configuration comprises at least a number of Radio-Frequency (RF) chains per PAA.

Example 151 includes the subject matter of any one of Examples 148-150, and optionally, wherein the number of data streams comprises one stream, two streams, or four streams.

Example 152 includes the subject matter of any one of Examples 148-151, and optionally, wherein the at least one PAA comprises one PAA or two PAAs.

Example 153 includes the subject matter of any one of Examples 148-152, and optionally, wherein the polarization type comprises a single polarization or a dual polarization.

Example 154 includes the subject matter of Example 148, and optionally, wherein the at least one PAA comprises a single PAA having a single polarization or a dual polarization.

Example 155 includes the subject matter of Example 148, and optionally, wherein the at least one PAA comprises two PAAs, a PAA of the two PAAs having a dual polarization or a single polarization.

Example 156 includes the subject matter of Example 148, and optionally, wherein the SU MIMO configuration comprises a single PAA, two data streams, and a single polarization.

Example 157 includes the subject matter of Example 156, and optionally, wherein the controller is configured to cause the first wireless station to receive the SU MIMO transmission by the single PAA via two respective directional beams having a same polarization.

Example 158 includes the subject matter of Example 157, and optionally, wherein the two directional beams comprise two Non Line of Sight (NLOS) beams.

Example 159 includes the subject matter of Example 148, and optionally, wherein the SU MIMO configuration comprises a single PAA, two data streams, and a dual polarization.

Example 160 includes the subject matter of Example 159, and optionally, wherein the controller is configured to cause the first wireless station to receive the SU MIMO transmission by the single PAA via two respective directional beams, the two directional beams having two respective different polarizations.

Example 161 includes the subject matter of Example 160, and optionally, wherein the two directional beams comprise two Line of Sight (LOS) beams.

Example 162 includes the subject matter of Example 148, and optionally, wherein the SU MIMO configuration comprises two PAAs, two data streams, a single polarization, and a distance between the two PAAs.

Example 163 includes the subject matter of Example 162, and optionally, wherein the controller is configured to cause the first wireless station to receive the SU MIMO transmission by the two PAAs via two respective directional beams having a same polarization.

Example 164 includes the subject matter of Example 148, and optionally, wherein the SU MIMO configuration comprises two PAAs, four data streams, a dual polarization, and a distance between the two PAAs.

Example 165 includes the subject matter of Example 164, and optionally, wherein the controller is configured to cause the first wireless station to receive the SU MIMO transmission by the two PAAs via four directional beams, a PAA of the two PAAs to receive two directional beams, the two directional beams having two respective different polarizations.

Example 166 includes the subject matter of Example 148, and optionally, wherein the SU MIMO configuration comprises a single PAA, a single data stream, two Radio Frequency (RF) chains, and a single polarization.

Example 167 includes the subject matter of Example 166, and optionally, wherein the controller is configured to cause the first wireless station to receive the SU MIMO transmission by the single PAA via a single directional beam, and to process the data stream by the two RF chains.

Example 168 includes the subject matter of any one of Examples 148-167, and optionally, wherein the controller is configured to cause the first wireless station to receive a message from the second wireless station prior to the SU MIMO transmission, the message comprising a first indication of the number of data streams, a second indication of the number of PAAs, and a third indication of the polarization type.

Example 169 includes the subject matter of any one of Examples 148-167, and optionally, wherein the controller is configured to cause the first wireless station to receive a message from the second wireless station prior to the SU MIMO transmission, the message comprising a configuration type indicator to indicate the predefined SU MIMO configuration.

Example 170 includes the subject matter of any one of Examples 148-169, and optionally, wherein the directional wireless communication band is a Directional Multi-Gigabit (DMG) band.

Example 171 includes the subject matter of any one of Examples 148-170, and optionally, wherein the first wireless station is a Directional Multi-Gigabit (DMG) Station (STA).

Example 172 includes the subject matter of any one of Examples 148-171, and optionally, wherein the first wireless station comprises the at least one PAA.

Example 173 includes a method to be performed at a first wireless station, the method comprising configuring at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and receiving via the at least one PAA an SU MIMO transmission from a second wireless station over a directional wireless communication band.

Example 174 includes the subject matter of Example 173, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 175 includes the subject matter of Example 173 or 174, and optionally, wherein the SU MIMO configuration comprises at least a number of Radio-Frequency (RF) chains per PAA.

Example 176 includes the subject matter of any one of Examples 173-175, and optionally, wherein the number of data streams comprises one stream, two streams, or four streams.

Example 177 includes the subject matter of any one of Examples 173-176, and optionally, wherein the at least one PAA comprises one PAA or two PAAs.

Example 178 includes the subject matter of any one of Examples 173-177, and optionally, wherein the polarization type comprises a single polarization or a dual polarization.

Example 179 includes the subject matter of Example 173, and optionally, wherein the at least one PAA comprises a single PAA having a single polarization or a dual polarization.

Example 180 includes the subject matter of Example 173, and optionally, wherein the at least one PAA comprises two PAAs, a PAA of the two PAAs having a dual polarization or a single polarization.

Example 181 includes the subject matter of Example 173, and optionally, wherein the SU MIMO configuration comprises a single PAA, two data streams, and a single polarization.

Example 182 includes the subject matter of Example 181, and optionally, comprising receiving the SU MIMO transmission by the single PAA via two respective directional beams having a same polarization.

Example 183 includes the subject matter of Example 182, and optionally, wherein the two directional beams comprise two Non Line of Sight (NLOS) beams.

Example 184 includes the subject matter of Example 173, and optionally, wherein the SU MIMO configuration comprises a single PAA, two data streams, and a dual polarization.

Example 185 includes the subject matter of Example 184, and optionally, comprising receiving the SU MIMO transmission by the single PAA via two respective directional beams, the two directional beams having two respective different polarizations.

Example 186 includes the subject matter of Example 185, and optionally, wherein the two directional beams comprise two Line of Sight (LOS) beams.

Example 187 includes the subject matter of Example 173, and optionally, wherein the SU MIMO configuration comprises two PAAs, two data streams, a single polarization, and a distance between the two PAAs.

Example 188 includes the subject matter of Example 187, and optionally, comprising receiving the SU MIMO transmission by the two PAAs via two respective directional beams having a same polarization.

Example 189 includes the subject matter of Example 173, and optionally, wherein the SU MIMO configuration comprises two PAAs, four data streams, a dual polarization, and a distance between the two PAAs.

Example 190 includes the subject matter of Example 189, and optionally, comprising receiving the SU MIMO transmission by the two PAAs via four directional beams, receiving the SU MIMO transmission comprises receiving two directional beams via a PAA of the two PAAs, the two directional beams having two respective different polarizations.

Example 191 includes the subject matter of Example 173, and optionally, wherein the SU MIMO configuration comprises a single PAA, a single data stream, two Radio Frequency (RF) chains, and a single polarization.

Example 192 includes the subject matter of Example 191, and optionally, comprising receiving the SU MIMO transmission by the single PAA via a single directional beam, and processing the data stream by the two RF chains.

Example 193 includes the subject matter of any one of Examples 173-192, and optionally, comprising receiving a message from the second wireless station prior to the SU MIMO transmission, the message comprising a first indication of the number of data streams, a second indication of the number of PAAs, and a third indication of the polarization type.

Example 194 includes the subject matter of any one of Examples 173-192, and optionally, comprising receiving a message from the second wireless station prior to the SU MIMO transmission, the message comprising a configuration type indicator to indicate the predefined SU MIMO configuration.

Example 195 includes the subject matter of any one of Examples 173-194, and optionally, wherein the directional wireless communication band is a Directional Multi-Gigabit (DMG) band.

Example 196 includes the subject matter of any one of Examples 173-195, and optionally, wherein the first wireless station is a Directional Multi-Gigabit (DMG) Station (STA).

Example 197 includes a product comprising one or more tangible computer-readable non-transitory storage media comprising computer-executable instructions operable to, when executed by at least one computer processor, enable the at least one computer processor to implement one or more operations at a first wireless station, the operations comprising configuring at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and receiving via the at least one PAA an SU MIMO transmission from a second wireless station over a directional wireless communication band.

Example 198 includes the subject matter of Example 197, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 199 includes the subject matter of Example 197 or 198, and optionally, wherein the SU MIMO configuration comprises at least a number of Radio-Frequency (RF) chains per PAA.

Example 200 includes the subject matter of any one of Examples 197-199, and optionally, wherein the number of data streams comprises one stream, two streams, or four streams.

Example 201 includes the subject matter of any one of Examples 197-200, and optionally, wherein the at least one PAA comprises one PAA or two PAAs.

Example 202 includes the subject matter of any one of Examples 197-201, and optionally, wherein the polarization type comprises a single polarization or a dual polarization.

Example 203 includes the subject matter of Example 197, and optionally, wherein the at least one PAA comprises a single PAA having a single polarization or a dual polarization.

Example 204 includes the subject matter of Example 197, and optionally, wherein the at least one PAA comprises two PAAs, a PAA of the two PAAs having a dual polarization or a single polarization.

Example 205 includes the subject matter of Example 197, and optionally, wherein the SU MIMO configuration comprises a single PAA, two data streams, and a single polarization.

Example 206 includes the subject matter of Example 205, and optionally, wherein the operations comprise receiving the SU MIMO transmission by the single PAA via two respective directional beams having a same polarization.

Example 207 includes the subject matter of Example 206, and optionally, wherein the two directional beams comprise two Non Line of Sight (NLOS) beams.

Example 208 includes the subject matter of Example 197, and optionally, wherein the SU MIMO configuration comprises a single PAA, two data streams, and a dual polarization.

Example 209 includes the subject matter of Example 208, and optionally, wherein the operations comprise receiving the SU MIMO transmission by the single PAA via two respective directional beams, the two directional beams having two respective different polarizations.

Example 210 includes the subject matter of Example 209, and optionally, wherein the two directional beams comprise two Line of Sight (LOS) beams.

Example 211 includes the subject matter of Example 197, and optionally, wherein the SU MIMO configuration comprises two PAAs, two data streams, a single polarization, and a distance between the two PAAs.

Example 212 includes the subject matter of Example 211, and optionally, wherein the operations comprise receiving the SU MIMO transmission by the two PAAs via two respective directional beams having a same polarization.

Example 213 includes the subject matter of Example 197, and optionally, wherein the SU MIMO configuration comprises two PAAs, four data streams, a dual polarization, and a distance between the two PAAs.

Example 214 includes the subject matter of Example 213, and optionally, wherein the operations comprise receiving the SU MIMO transmission by the two PAAs via four directional beams, receiving the SU MIMO transmission comprises receiving two directional beams via a PAA of the two PAAs, the two directional beams having two respective different polarizations.

Example 215 includes the subject matter of Example 197, and optionally, wherein the SU MIMO configuration comprises a single PAA, a single data stream, two Radio Frequency (RF) chains, and a single polarization.

Example 216 includes the subject matter of Example 215, and optionally, wherein the operations comprise receiving the SU MIMO transmission by the single PAA via a single directional beam, and processing the data stream by the two RF chains.

Example 217 includes the subject matter of any one of Examples 197-216, and optionally, wherein the operations comprise receiving a message from the second wireless station prior to the SU MIMO transmission, the message comprising a first indication of the number of data streams, a second indication of the number of PAAs, and a third indication of the polarization type.

Example 218 includes the subject matter of any one of Examples 197-216, and optionally, wherein the operations comprise receiving a message from the second wireless station prior to the SU MIMO transmission, the message comprising a configuration type indicator to indicate the predefined SU MIMO configuration.

Example 219 includes the subject matter of any one of Examples 197-218, and optionally, wherein the directional wireless communication band is a Directional Multi-Gigabit (DMG) band.

Example 220 includes the subject matter of any one of Examples 197-219, and optionally, wherein the first wireless station is a Directional Multi-Gigabit (DMG) Station (STA).

Example 221 includes an apparatus of a first wireless station comprising means for configuring at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station; and means for receiving via the at least one PAA an SU MIMO transmission from a second wireless station over a directional wireless communication band.

Example 222 includes the subject matter of Example 221, and optionally, wherein the SU MIMO configuration comprises at least a number of PAAs to be used by the second wireless station, a polarization type to be applied at the second wireless station, and a number of Radio-Frequency (RF) chains per PAA at the second wireless station.

Example 223 includes the subject matter of Example 221 or 222, and optionally, wherein the SU MIMO configuration comprises at least a number of Radio-Frequency (RF) chains per PAA.

Example 224 includes the subject matter of any one of Examples 221-223, and optionally, wherein the number of data streams comprises one stream, two streams, or four streams.

Example 225 includes the subject matter of any one of Examples 221-224, and optionally, wherein the at least one PAA comprises one PAA or two PAAs.

Example 226 includes the subject matter of any one of Examples 221-225, and optionally, wherein the polarization type comprises a single polarization or a dual polarization.

Example 227 includes the subject matter of Example 221, and optionally, wherein the at least one PAA comprises a single PAA having a single polarization or a dual polarization.

Example 228 includes the subject matter of Example 221, and optionally, wherein the at least one PAA comprises two PAAs, a PAA of the two PAAs having a dual polarization or a single polarization.

Example 229 includes the subject matter of Example 221, and optionally, wherein the SU MIMO configuration comprises a single PAA, two data streams, and a single polarization.

Example 230 includes the subject matter of Example 229, and optionally, comprising means for receiving the SU MIMO transmission by the single PAA via two respective directional beams having a same polarization.

Example 231 includes the subject matter of Example 230, and optionally, wherein the two directional beams comprise two Non Line of Sight (NLOS) beams.

Example 232 includes the subject matter of Example 221, and optionally, wherein the SU MIMO configuration comprises a single PAA, two data streams, and a dual polarization.

Example 233 includes the subject matter of Example 232, and optionally, comprising means for receiving the SU MIMO transmission by the single PAA via two respective directional beams, the two directional beams having two respective different polarizations.

Example 234 includes the subject matter of Example 233, and optionally, wherein the two directional beams comprise two Line of Sight (LOS) beams.

Example 235 includes the subject matter of Example 221, and optionally, wherein the SU MIMO configuration comprises two PAAs, two data streams, a single polarization, and a distance between the two PAAs.

Example 236 includes the subject matter of Example 235, and optionally, comprising means for receiving the SU MIMO transmission by the two PAAs via two respective directional beams having a same polarization.

Example 237 includes the subject matter of Example 221, and optionally, wherein the SU MIMO configuration comprises two PAAs, four data streams, a dual polarization, and a distance between the two PAAs.

Example 238 includes the subject matter of Example 237, and optionally, comprising means for receiving the SU MIMO transmission by the two PAAs via four directional beams, receiving the SU MIMO transmission comprises receiving two directional beams via a PAA of the two PAAs, the two directional beams having two respective different polarizations.

Example 239 includes the subject matter of Example 221, and optionally, wherein the SU MIMO configuration comprises a single PAA, a single data stream, two Radio Frequency (RF) chains, and a single polarization.

Example 240 includes the subject matter of Example 239, and optionally, comprising means for receiving the SU MIMO transmission by the single PAA via a single directional beam, and processing the data stream by the two RF chains.

Example 241 includes the subject matter of any one of Examples 221-240, and optionally, comprising means for receiving a message from the second wireless station prior to the SU MIMO transmission, the message comprising a first indication of the number of data streams, a second indication of the number of PAAs, and a third indication of the polarization type.

Example 242 includes the subject matter of any one of Examples 221-240, and optionally, comprising means for receiving a message from the second wireless station prior to the SU MIMO transmission, the message comprising a configuration type indicator to indicate the predefined SU MIMO configuration.

Example 243 includes the subject matter of any one of Examples 221-242, and optionally, wherein the directional wireless communication band is a Directional Multi-Gigabit (DMG) band.

Example 244 includes the subject matter of any one of Examples 221-243, and optionally, wherein the first wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first wireless station to:
   configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, and a polarization type to be applied at the first wireless station;
   transmit a message to a second wireless station, the message comprising a first indication of said number of data streams, a second indication of said number of PAAs, and a third indication of said polarization type; and
   subsequent to said message, transmit a SU MIMO transmission to said second wireless station via the at least one PAA over a directional wireless communication band.

2. The apparatus of claim 1, wherein said at least one PAA comprises two PAAs, a PAA of said two PAAs having a dual polarization or a single polarization.

3. The apparatus of claim 1, wherein the SU MIMO configuration comprises a single PAA, two data streams, and a single polarization.

4. The apparatus of claim 3 configured to cause the first wireless station to transmit said SU MIMO transmission by said single PAA via two respective directional beams having a same polarization.

5. The apparatus of claim 1, wherein the SU MIMO configuration comprises a single PAA, two data streams, and a dual polarization.

6. The apparatus of claim 5 configured to cause the first wireless station to transmit said SU MIMO transmission by said single PAA via two respective directional beams, the two directional beams having two respective different polarizations.

7. The apparatus of claim 1, wherein the SU MIMO configuration comprises a single PAA, a single data stream, and a single polarization.

8. An apparatus comprising logic and circuitry configured to cause a first wireless station to:
   configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, a polarization type to be applied at the first wireless station, a number of PAAs to be used by a second wireless station, a polarization type to be applied at the second wireless station, and a number of Radio-Frequency (RF) chains per PAA at the second wireless station, and
   transmit a SU MIMO transmission to said second wireless station via the at least one PAA over a directional wireless communication band.

9. The apparatus of claim 1 comprising the at least one PAA, a memory, and a processor.

10. An apparatus comprising logic and circuitry configured to cause a first wireless station to:
    configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, a polarization type to be applied at the first wireless station, and a number of Radio-Frequency (RF) chains per PAA; and
    transmit a SU MIMO transmission to a second wireless station via the at least one PAA over a directional wireless communication band.

11. The apparatus of claim 10 configured to cause the first wireless station to transmit a message to the second wireless station prior to said SU MIMO transmission, the message comprising a first indication of said number of data streams, a second indication of said number of PAAs, and a third indication of said polarization type.

12. An apparatus comprising logic and circuitry configured to cause a first wireless station to:
    configure at least one Phase Antenna Array (PAA) according to a predefined Single-User (SU) Multi-In-Multi-Out (MIMO) configuration, the SU MIMO configuration comprising at least two PAAs to be used by the first wireless station, two data streams, a single polarization to be applied at the first wireless station, and a distance between said two PAAs; and
    transmit a SU MIMO transmission to a second wireless station via the at least one PAA over a directional wireless communication band.

13. The apparatus of claim 12 configured to cause the first wireless station to transmit said SU MIMO transmission by said two PAAs via two respective directional beams having a same polarization.

14. An apparatus comprising logic and circuitry configured to cause a first wireless station to:
    configure at least one Phase Antenna Array (PAA) according to a predefined Single-User (SU) Multi-In-Multi-Out (MIMO) configuration, the SU MIMO configuration comprising at least two PAAs to be used by the first wireless station, four data streams, a dual polarization to be applied at the first wireless station, and a distance between said two PAAs; and
    transmit a SU MIMO transmission to a second wireless station via the at least one PAA over a directional wireless communication band.

15. The apparatus of claim 14 configured to cause the first wireless station to transmit said SU MIMO transmission by said two PAAs via four directional beams, a PAA of said two PAAs to transmit two directional beams, the two directional beams having two respective different polarizations.

16. A product comprising one or more tangible computer-readable non-transitory storage media comprising computer-executable instructions operable to, when executed by at least one computer processor, enable the at least one computer processor to cause a first wireless station to:

configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, a polarization type to be applied at the first wireless station, and a number of Radio-Frequency (RF) chains per PAA at the first wireless station; and transmit a SU MIMO transmission to a second wireless station via the at least one PAA over a directional wireless communication band.

17. The product of claim 16, wherein the SU MIMO configuration comprises at least a number of PAAs to be used by the second wireless station, a polarization type to be applied at the second wireless station, and a number of RF chains per PAA at the second wireless station.

18. The product of claim 16, wherein the instructions, when executed, cause the first wireless station to transmit a message to the second wireless station prior to said SU MIMO transmission, the message comprising a configuration type indicator to indicate said predefined SU MIMO configuration.

19. An apparatus comprising logic and circuitry configured to cause a first wireless station to:

receive a message from a second wireless station, the message comprising a first indication of a number of data streams, a second indication of a number of Phase Antenna Arrays (PAAs) to be used by the first wireless station, and a third indication of a polarization type to be applied at the first wireless station;

configure at least one PAA according to a predefined Single-User (SU) Multi-In-Multi-Out (MIMO) configuration, the SU MIMO configuration comprising at least said number of data streams, said number of PAAs, and said polarization type; and subsequent to said message, receive via the at least one PAA a SU MIMO transmission from said second wireless station over a directional wireless communication band.

20. The apparatus of claim 19 comprising the at least one PAA, a memory, and a processor.

21. An apparatus comprising logic and circuitry configured to cause a first wireless station to:

configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, a polarization type to be applied at the first wireless station, a number of PAAs to be used by a second wireless station, a polarization type to be applied at the second wireless station, and a number of Radio-Frequency (RF) chains per PAA at the second wireless station; and receive via the at least one PAA a SU MIMO transmission from said second wireless station over a directional wireless communication band.

22. The apparatus of claim 21 configured to cause the first wireless station to receive a message from the second wireless station prior to said SU MIMO transmission, the message comprising a first indication of said number of data streams, a second indication of the number of PAAs to be used by the first wireless station, and a third indication of the polarization type to be applied at the first wireless station.

23. A product comprising one or more tangible computer-readable non-transitory storage media comprising computer-executable instructions operable to, when executed by at least one computer processor, enable the at least one computer processor to cause a first wireless station to:

configure at least one Phase Antenna Array (PAA) according to a predefined Single-User (SU) Multi-In-Multi-Out (MIMO) configuration, the SU MIMO configuration comprising at least a number of data streams, a number of PAAs to be used by the first wireless station, a polarization type to be applied at the first wireless station, a number of PAAs to be used by a second wireless station, a polarization type to be applied at the second wireless station, and a number of Radio-Frequency (RF) chains per PAA at the second wireless station; and receive via the at least one PAA a SU MIMO transmission from a-Said second wireless station over a directional wireless communication band.

24. The product of claim 23, wherein the SU MIMO configuration comprises at least a number of RF chains per PAA at the first wireless station.

25. The product of claim 23, wherein the instructions, when executed, cause the first wireless station to receive a message from the second wireless station prior to said SU MIMO transmission, the message comprising a configuration type indicator to indicate said predefined SU MIMO configuration.

* * * * *

UNITED STATES PATENT AND TRADEMARK OFFICE
CERTIFICATE OF CORRECTION

| | | |
|---|---|---|
| PATENT NO. | : 9,698,877 B2 | Page 1 of 1 |
| APPLICATION NO. | : 14/998278 | |
| DATED | : July 4, 2017 | |
| INVENTOR(S) | : Artyom Lomayev et al. | |

It is certified that error appears in the above-identified patent and that said Letters Patent is hereby corrected as shown below:

In the Claims

In Column 50, Line 36, in Claim 23, delete "a-Said" and insert -- said --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*